(12) United States Patent
Gidley et al.

(10) Patent No.: US 10,867,016 B2
(45) Date of Patent: Dec. 15, 2020

(54) SECURING WEBPAGES, WEBAPPS AND APPLICATIONS

(71) Applicant: IRDETO B.V., Hoofddorp (NL)

(72) Inventors: Benjamin Geoffrey Gidley, Hoofddorp (NL); Catherine Chambers, Ottawa (CA); Yaser Eftekhari Roozbehani, Ottawa (CA); Yegui Cai, Ottawa (CA); Yuan Xiang Gu, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 213 days.

(21) Appl. No.: 16/062,130

(22) PCT Filed: Dec. 14, 2016

(86) PCT No.: PCT/EP2016/081063
§ 371 (c)(1),
(2) Date: Jun. 14, 2018

(87) PCT Pub. No.: WO2017/102880
PCT Pub. Date: Jun. 22, 2017

(65) Prior Publication Data
US 2018/0373849 A1 Dec. 27, 2018

(30) Foreign Application Priority Data
Dec. 17, 2015 (GB) .................................. 1522315.9

(51) Int. Cl.
*G06F 21/12* (2013.01)
*G06F 21/54* (2013.01)
(Continued)

(52) U.S. Cl.
CPC ............ *G06F 21/128* (2013.01); *G06F 21/16* (2013.01); *G06F 21/54* (2013.01); *G06F 21/554* (2013.01);
(Continued)

(58) Field of Classification Search
CPC .... G06F 21/128; G06F 21/16; G06F 21/6245; G06F 21/54; G06F 21/554; H04L 9/3271; H04L 2209/608; H04L 2209/16
See application file for complete search history.

(56) References Cited

U.S. PATENT DOCUMENTS

| | | | |
|---|---|---|---|
| 6,249,882 B1 * | 6/2001 | Testardi | ............ G06F 11/3672 714/38.14 |
| 8,677,481 B1 * | 3/2014 | Lee | ....................... H04L 63/168 726/22 |

(Continued)

FOREIGN PATENT DOCUMENTS

| | | | |
|---|---|---|---|
| CA | 2946695 A1 | 10/2015 | |
| JP | 2007200316 A | 8/2007 | |

(Continued)

OTHER PUBLICATIONS

Buchler et al., "Semi-Automatic Security Testing of Web Applications from a Secure Model", 2012, IEEE, pp. 253-262. (Year: 2012).*

(Continued)

*Primary Examiner* — Matthew Smithers
(74) *Attorney, Agent, or Firm* — Rimon PC; Marc Kaufman

(57) ABSTRACT

A method for securing a webpage or a webapp processed by a browser executing on a client system, the method comprising the browser executing an instance of white-box protected code, wherein execution of the instance of white-box protected code causes the client system to: generate a message comprising message data for use by a control system to perform one or more security tests, the control system communicably connected to the client system via a network; send the message to the control system to enable the control system to perform the one or more security tests (Continued)

using the message data; receive a response from the control system based, at least in part, on the message; and process the response.

38 Claims, 18 Drawing Sheets

(51) Int. Cl.
G06F 21/55 (2013.01)
G06F 21/16 (2013.01)
H04L 9/32 (2006.01)
G06F 21/62 (2013.01)

(52) U.S. Cl.
CPC ........ *G06F 21/6245* (2013.01); *H04L 9/3271* (2013.01); *H04L 2209/16* (2013.01); *H04L 2209/608* (2013.01)

(56) References Cited

U.S. PATENT DOCUMENTS

| | | | | |
|---|---|---|---|---|
| 9,471,776 | B2* | 10/2016 | Gu | G06F 21/54 |
| 9,979,726 | B2* | 5/2018 | Freitas Fortuna dos Santos | G06F 21/554 |
| 2003/0159063 | A1* | 8/2003 | Apfelbaum | G06F 21/577 726/25 |
| 2004/0268322 | A1* | 12/2004 | Chow | G06F 21/14 717/136 |
| 2007/0033588 | A1* | 2/2007 | Landsman | H04L 67/06 717/178 |
| 2007/0061782 | A1* | 3/2007 | Schreiner | G06F 8/71 717/124 |
| 2007/0180503 | A1 | 8/2007 | Li et al. | |
| 2011/0047620 | A1 | 2/2011 | Mahaffey et al. | |
| 2012/0192283 | A1* | 7/2012 | Gu | G06F 21/14 726/26 |
| 2012/0260344 | A1* | 10/2012 | Maor | G06F 11/3688 726/25 |
| 2012/0284506 | A1* | 11/2012 | Kravitz | G06Q 40/00 713/151 |
| 2012/0304296 | A1* | 11/2012 | Shulman | H04L 63/1433 726/23 |
| 2015/0169434 | A1* | 6/2015 | De Angelis | G06F 11/3688 717/126 |
| 2015/0256556 | A1* | 9/2015 | Kaminsky | H04L 63/168 726/23 |
| 2016/0119344 | A1 | 4/2016 | Freitas Fortuna dos Santos et al. | |
| 2017/0048272 | A1 | 2/2017 | Yamamura et al. | |
| 2017/0185784 | A1* | 6/2017 | Madou | G06F 21/54 |

FOREIGN PATENT DOCUMENTS

| | | |
|---|---|---|
| JP | 2010198054 A | 9/2010 |
| JP | 2011514091 A | 4/2011 |
| JP | 2011253211 A | 12/2011 |
| JP | 2013201589 A | 10/2013 |
| JP | 2013540303 A | 10/2013 |
| JP | 2014534498 A | 12/2014 |
| WO | 2009109884 A1 | 9/2009 |
| WO | 2013142947 A1 | 10/2013 |
| WO | 2015001535 A1 | 1/2015 |
| WO | 2015150391 A1 | 10/2015 |
| WO | 2015162985 A1 | 10/2015 |

OTHER PUBLICATIONS

Zhu et al., "Testing a Web Application Involving Web Browser Interaction", 2009, IEEE, pp. 589-594. (Year: 2009).*
S. Chow, et al. "A White-Box DES Implementation for DRM Applications", Cloakware Corp., Version: Oct. 15, 2002; Pre-proceedings for ACM DRM-2002 workshop.
W3C, "User Interface Security Directives for Content Security Policy", W3C Editor's Draft Jun. 30, 2014, https://dvcs.w3.org/hg/user-interface-safety/raw-file/tip/user-interface-safety.html.
Wikipedia, "Single Sign-On", Last updated on Nov. 23, 2015 at 23:09 by Mindmatrix, https://en.wikipedia.org/w/index.php?title=Single_sign-on&oldid=692119902.
Wikipedia, "Web Application", Last updated Dec. 14, 2015 at 00:48 by Coolcaesar, https://en.wikipedia.org/w/index.php?title=Web_application&oldid=695135786.
S. Chow, "White-Box Cryptography and an AEAS Implementation", Clockware Corporation.
Japan Patent Office, Office Action for Japanese Application No. 2018-531552, dated Jun. 24, 2019 (English translation).
Japan Patent Office, Office Action for Japanese Application No. 2018-531552, dated Mar. 2, 2020 (English translation).
Canadian Intellectual Property Office, Canada Examination Report for Canadian Application No. 3,008,199 dated May 7, 2019.

* cited by examiner

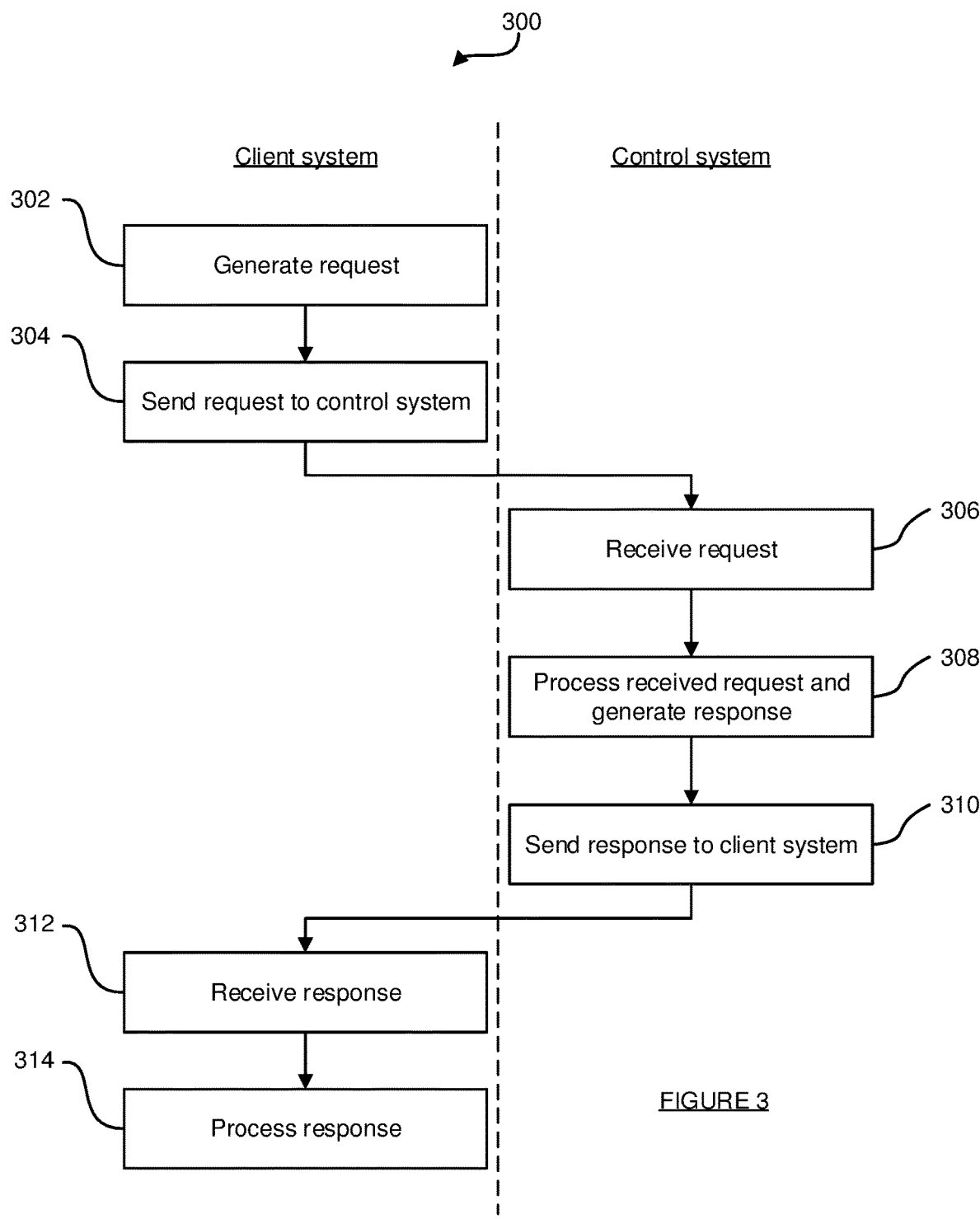

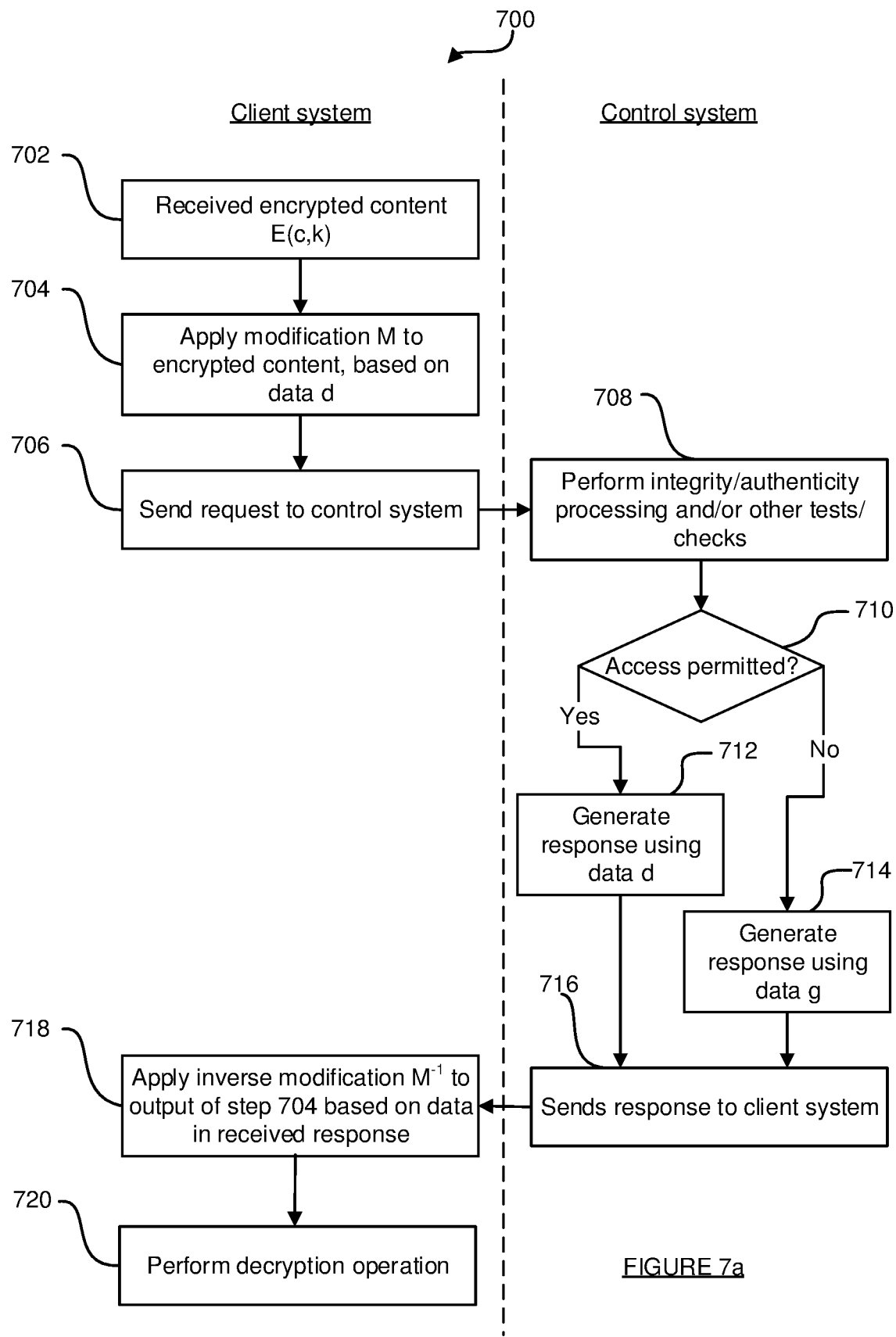

SECURING WEBPAGES, WEBAPPS AND APPLICATIONS

CROSS-REFERENCE TO RELATED APPLICATION

The present application is the US national phase application of international application PCT/EP2016/081063 filed on Dec. 14, 2016 and titled Securing Webpages, Webapps and Applications, which claims priority to Great Britain patent application No. 1522315.9 filed on Dec. 17, 2015, the entire content of both being incorporated hereby by reference.

FIELD OF THE INVENTION

The present invention relates to methods for securing a webpage or a webapp (or other applications), methods for providing webpages or webapps (or other applications), and systems and computer programs for carrying out such methods.

BACKGROUND OF THE INVENTION

It is well-known to provide webpages, webapps or other applications to a user's computer system. The webpages and webapps may be processed, or executed, using a browser running on the user's computer system. The other applications may be executed outside of, or independent of, the browser environment. The user's computer system and browser are, generally, outside of the control of the provider of the webpage, webapp or application. This means that the user of the computer system can try to launch attacks against, or using, the webpage, webapp or application. Such attacks can be for a variety of purposes, such as financial gain for the user, misappropriation of sensitive information, access to content or services to which the user is not entitled, etc. The user may be able to configure or use the computer system and/or browser to make launching such attacks easier, or to try to increase the likelihood of the attacks being successful.

SUMMARY OF THE INVENTION

It would, therefore, be desirable to be able to provide webpages, webapps or other applications to a user's computer system in a more secured manner, and enable the webpages, webapps or other applications to be processed or executed in a secured manner. This would make is harder for attacks to be launched, or would decrease the likelihood of the attacks being successful. This, in turn, helps reduce the consequences of successful attacks, such as reducing or avoiding financial loss, avoiding misappropriation of sensitive information, denying the attacker access to content or services to which the attacker is not entitled or authorized, etc According to a first aspect of the invention, there is provided a method for securing a webpage or a webapp processed by a browser executing on a client system, the method comprising the browser executing an instance of white-box protected code, wherein execution of the instance of white-box protected code causes the client system to: generate a message comprising message data for use by a control system to perform one or more security tests, the control system communicably connected to the client system via a network; send the message to the control system to enable the control system to perform the one or more security tests using the message data; receive a response from the control system based, at least in part, on the message; and process the response.

According to a second aspect of the invention, there is provided a method for securing a webpage or a webapp processed by a browser executing on a client system, the method comprising, at a control system communicably connected to the client system via a network: receiving a message from the client system, the message comprising message data for use by the control system to perform one or more security tests, the message generated by an instance of white-box protected code being executed by the browser; performing the one or more security tests using the message data; generating a response based, at least in part, on the message; and sending the response to the client system for processing by the client system.

In some embodiments of the first and second aspects, the instance of white-box protected code is part of the webpage or webapp.

In some embodiments of the first and second aspects, at least part of the message data is indicative of an identity of the instance of white-box protected code.

In some embodiments of the first and second aspects, the one or more security tests comprises one or more of: (a) a test to verify integrity of some or all of the instance of white-box protected code; (b) a test to verify integrity of some or all of the webpage or webapp; (c) a test to identify whether the instance of white-box protected code is being executed using a debugger; (d) a test to identify whether data relating to, or provided by, the webpage or webapp is being, or has been, copied; (e) a test to identify whether validation of data fields of the webpage or webapp is turned on or off; (f) a test to identify whether blocking of advertisements is turned on or off. The test to verify integrity of some or all of the webpage or webapp may comprise verifying integrity of some or all of the DOM of the webpage or webapp.

In some embodiments of the first and second aspects, the response is generated, at least in part, based on an outcome of the one or more security tests.

In some embodiments of the first and second aspects, the response, when processed by the client system, causes the client system to perform one or more of: (a) provide, or continue to provide, functionality of the webpage or webapp; (b) prevent provision of, or cease provision of, functionality of the webpage or webapp; (c) provide functionality that is alternative or supplementary to functionality of the webpage or webapp; (d) change one or more configuration settings of the client system and/or of the browser.

In some embodiments of the first and second aspects, the response comprises response data, and the instance of white-box protected code is arranged to generate, based on the response data, message data of a subsequent message for use by the control system to perform the one or more security tests. The response data may identify (i) one or more portions of the instance of white-box protected code and/or (ii) one or more portions of the webpage or webapp, wherein an integrity verification test is to be performed by the control system based on said one or more portions.

In some embodiments of the first and second aspects, the instance of white-box protected code is arranged to generate the message in encrypted form and the control system is arranged to generate the response in encrypted form.

In some embodiments of the first and second aspects, the network comprises the Internet.

In some embodiments of the first and second aspects, said webpage or webapp is arranged to interact with a service system communicably connected to the client system via a network, and the message comprises a request to be sent to the service system. For the second aspect, the method may comprise at least one of: (a) the control system interacting with the service system; and (b) determining, based on an outcome of the one or more security tests, whether the control system should interact with the service system and, if it is determined that the control system should interact with the service system, the control system interacting with the service system. The response may be generated based, at least in part, on the interaction of the control system with the service system, and the response may then comprises a reply, from the service system, to the request. Additionally or alternatively, the method may comprise the control system storing data, based on the message, in a repository for subsequent access by the service system. Additionally or alternatively, the method may comprise the control system providing the service system an indication of an outcome of the one or more security tests.

The service system may provide financial services and the webpage or webapp provides access to the financial services. The financial services may comprise one or more of: accessing a financial account; and/or financially interacting with a merchant.

In some embodiments of the first and second aspects, the webpage or webapp provides access to content via a content distribution network.

In such embodiments, the instance of white-box protected code may be arranged to obtain a modified version of encrypted content, the modified version of encrypted content comprising the encrypted content with a first modification applied thereto; the response may comprises data indicative of a second modification to apply to the modified version of encrypted content; processing the response may comprise the instance of white-box protected code applying the second modification to the modified version of encrypted content to form processed modified encrypted content; and the webpage or webapp may be arranged to output content based on the processed modified encrypted content. The second modification may then be arranged so that the processed modified encrypted content equals the encrypted content only if an outcome of the one or more tests indicates that the client system is authorized to access the content. Additionally or alternatively, (i) the instance of white-box protected code may be arranged to receive the encrypted content and apply the first modification to the received encrypted content to thereby obtain the modified version of encrypted content; or (ii) the instance of white-box protected code may be arranged to receive the modified version of encrypted content via the network.

In some embodiments of the first and second aspects, at least one of the one or more security tests is based, at least in part, on metadata associated with the instance of white-box protected code, the metadata accessible by the control system.

According to a third aspect of the invention, there is provided a computer program which, when executed by a processor, causes the processor to carry out the method of the second aspect (or any of the above-described embodiments of the second aspect).

According to a fourth aspect of the invention, there is provided a system arranged to carry out the method of the second aspect (or any of the above-described embodiments of the second aspect).

According to a fifth aspect of the invention, there is provided an instance of white-box protected code, wherein execution of the instance of white-box protected code by a browser of a client system causes the client system to carry out a method of the first aspect (or any of the above-described embodiments of the first aspect).

According to a sixth aspect of the invention, there is provided a method of providing a webpage or a webapp to a client system, the method comprising providing a webpage or webapp that comprises an instance of white-box protected code according to the above fifth aspect, execution of the instance of white-box protected code thereby securing the webpage or webapp.

In some embodiments of the sixth aspect, the method comprises determining, by a system according to the above fourth aspect, a particular instance, from a plurality of instances of white-box protected code, to include as part of the webpage or webapp to provide to the client system.

According to a seventh aspect of the invention, there is provided a method of providing a webpage or a webapp to a client system, the method comprising providing a webpage or webapp that comprises an address from which an instance of white-box protected code according to the above fifth aspect is obtainable, execution of the instance of white-box protected code thereby securing the webpage or webapp.

In some embodiments of the seventh aspect, the method comprises determining, by a system according to the above fourth aspect, a particular instance, from a plurality of instances of white-box protected code, to provide to the client system in response to a request from the client system via the address.

According to an eighth aspect of the invention, there is provided a method comprising: generating a plurality of instances of white-box protected code according to the above fifth aspect; and storing the plurality of instances of white-box protected code in a database accessible by a system according to the above fourth aspect.

In some embodiments of the eighth aspect, the method comprises generating, and storing in the database, respective metadata associated with each of the plurality of instances of white-box protected code, the metadata for use by the system to perform said one or more security tests, the metadata accessible by the system.

According to a ninth aspect of the invention, there is provided a system arranged to carry out a method according to any one the sixth, seventh or eighth aspects (or embodiments thereof).

According to a tenth aspect of the invention, there is provided a computer program which, when executed by one or more processors, causes the one or more processors to carry out a method according to any one the sixth, seventh or eighth aspects (or embodiments thereof).

According to an eleventh aspect of the invention, there is provided a computer-readable medium storing a computer program according to the above third aspect or the above tenth aspect claim 26 or 36, or storing an instance of white-box protected code according to the above fifth aspect.

According to a twelfth aspect of the invention, there is provided a system arranged to execute an instance of white-box protected code by a browser of the system, wherein execution of the instance of white-box protected code by the browser causes the system to carry out a method of the first aspect (or any of the above-described embodiments of the first aspect).

BRIEF DESCRIPTION OF THE DRAWINGS

Embodiments of the invention will now be described, by way of example only, with reference to the accompanying drawings, in which:

FIG. 3 is a flowchart illustrating an example method of the interaction of a client system and a control system according to some embodiments of the invention;

FIG. 7a is a flowchart illustrating a method, according to some embodiments of the invention, in which protected code may work with a controller application (in the manner set out in the method of FIG. 3) so as to implement integrity/modification checking and enforcement.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—Example Computer System

Figure 1:
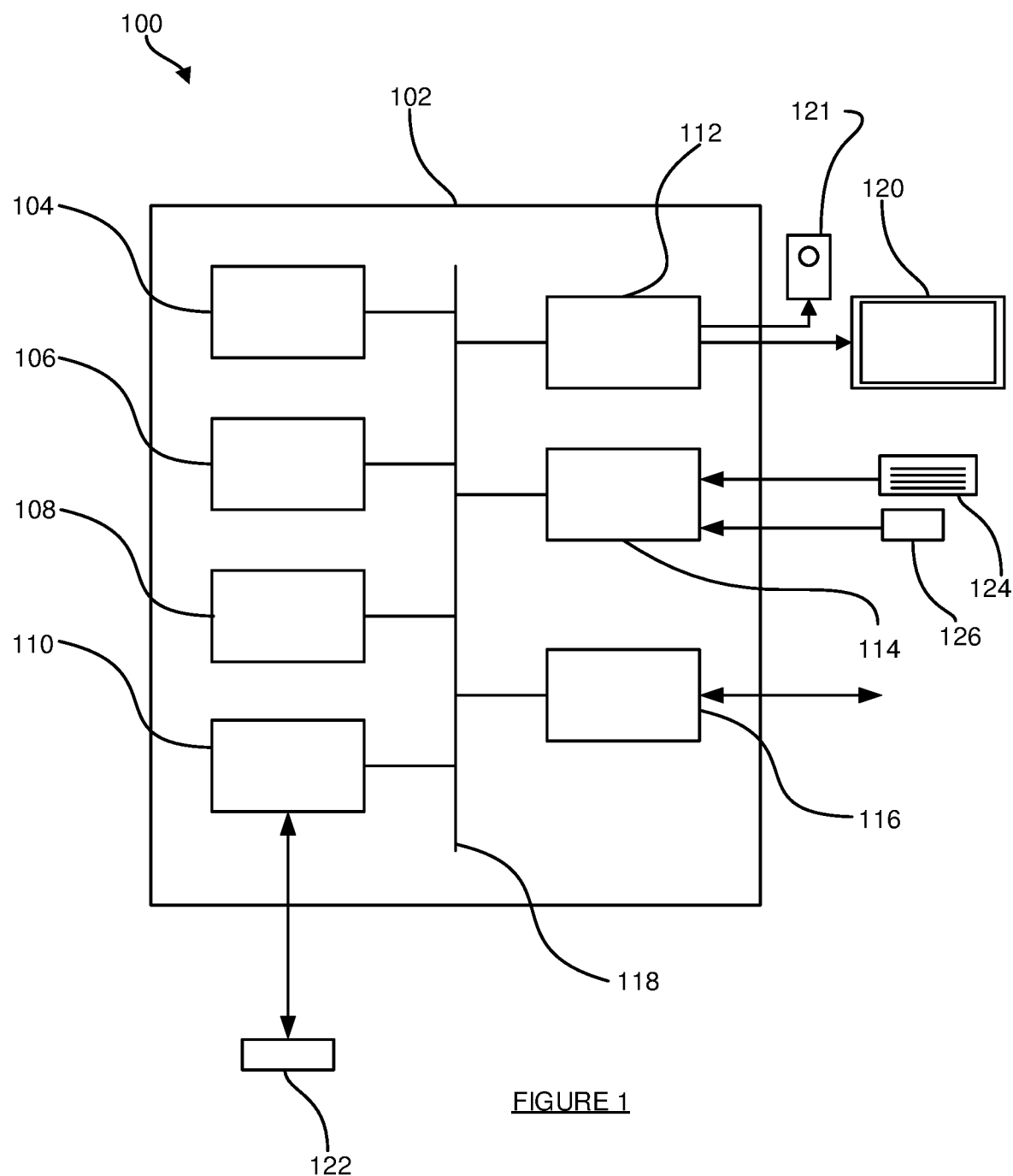
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to some embodiments of the invention and configure the system 100 to be a system according to some embodiments of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—System Architecture and Use

Figure 2A:
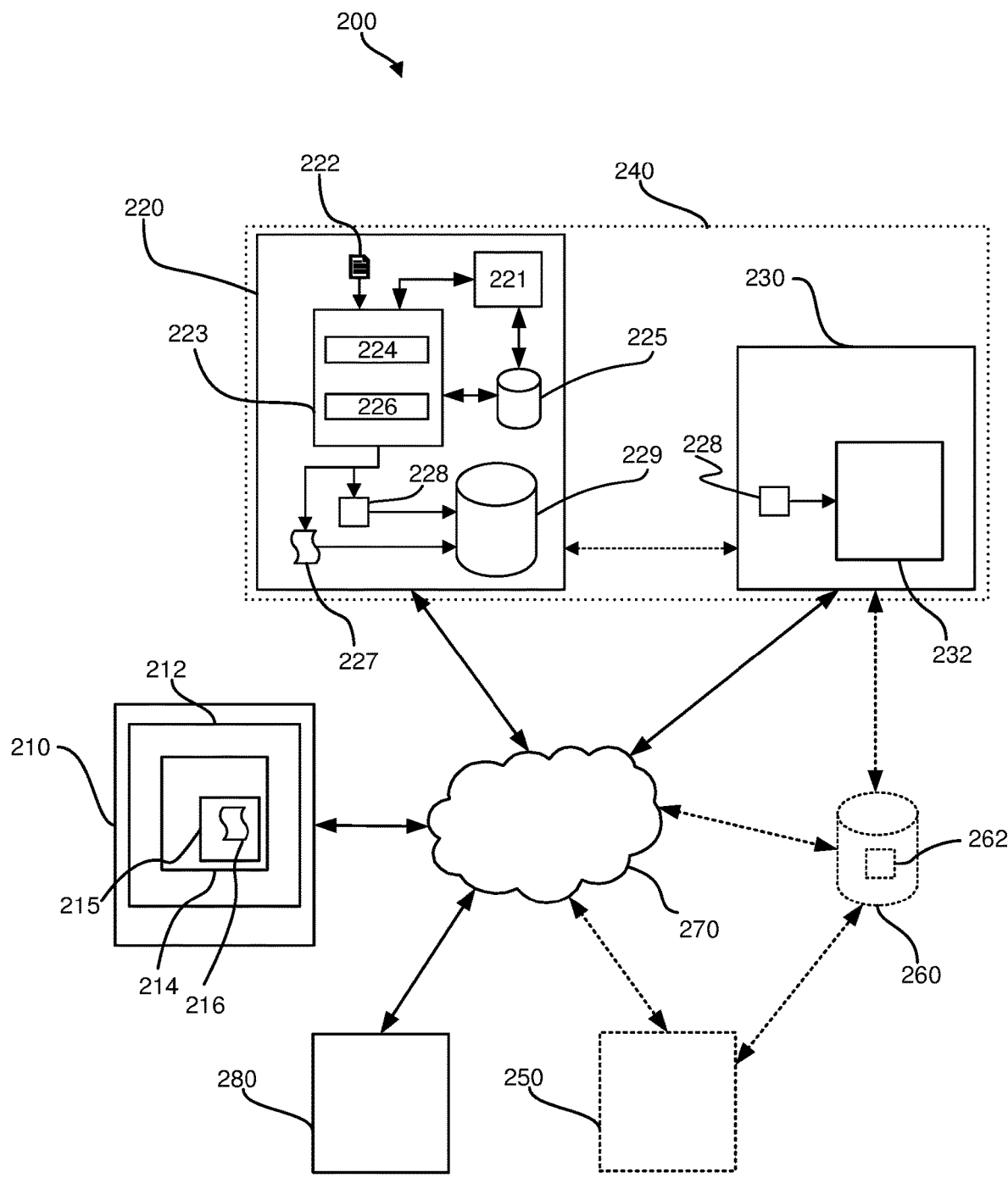
FIGS. 2a, 2b and 2c schematically illustrate example systems according to some embodiments of the invention.

FIG. 2a schematically illustrates an example system 200 according to some embodiments of the invention. The system 200 comprises a client system 210, a protection system 220, a control (or manager) system 230, a provider system 280 and a network 270. The system 200 may also comprise an optional service system 250 and an optional data repository 260.

In summary, the client system 210 is arranged to execute or process a webpage 214 (or a webapp 214 or an application 214). In order to ensure that this is performed in a secured and trusted way, the protection system 220 is responsible for generating protected code 216, to form part of (or be accessed from) the webpage 214 and to be executed by the client system 210. The control system 230 interacts with the client system 210 (or the protected code 216 executing at the client system 210) in order to carry out operations such as authentication of the protected code 216, integrity verification of the protected code 216, etc. and, based on the outcome of these operations, the control system 230 carries out corresponding functions (such as enabling the client system 210 to continue processing the webpage 214 or denying the client system 210 access to content or functionality of the webpage 214, etc.). The client system 210 initially requests (and obtains at least part of) the webpage 214 from the provider system 280—for example, the provider system 280 may be the host of a website or may be an app store. The service system 250 may be a system with which the webpage 214 wishes to interact as part of its processing. The service system 250 may be a system different from the provider system 280 although, as discussed later, the service system 250 may be the same as, or a sub-system of, the provider system 280.

As shall become apparent, the system 200 enables protection of webpages 214 (including their functionality and the data that they process/handle) to be implemented and enforced without having to trust the client system 210 and/or the environment in which the webpage 214 is being used (i.e. untrusted browsers can be used).

The client system 210, the protection system 220, the provider system 280 and the control system 230 may be arranged to communicate with each other over, or via, the network 270. The network 270 may be any kind of network suitable for transmitting or communicating data from any one of the client system 210, the protection system 220, the provider system 280 and the control system 230 to another one of the client system 210, the protection system 220, the provider system 280 and the control system 230. For example, the network 270 could comprise one or more of a local area network, a wide area network, a metropolitan area network, the internet, a wireless communications network, a cable network, a digital broadcast network, a satellite communication network, a telephone network, etc. The client system 210, the protection system 220, the provider system 280 and the control system 230 may communicate over the network 270 via any suitable communication mechanism/protocol in order to communicate data with each other. However, it will be appreciated that other communication scenarios are possible.

Whilst FIG. 2a illustrates a single client system 210, a single protection system 220, a single provider system 280 and a single control system 230, it will be appreciated that there may be multiple client systems 210 and/or multiple protection systems 220 and/or multiple provider systems 280 and/or multiple control systems 230 and that FIG. 2a has been simplified for ease of illustration.

The client system 210, the protection system 220, the provider system 280 and the control system 230 may each be, or may each comprise, one or more computer systems 100 as described above with reference to FIG. 1. For example, the client system 210 may be a personal computer, a server computer, a laptop, a mobile telephone, a tablet computer, a television, etc. Similarly, the protection system 220, the provider system 280 and the control system 230 may, for example, each comprise one or more server computers.

The protection system 220 and the control system 230 may be operated by separate entities, or may be operated by the same entity. The protection system 220 and the control system 230 may be physically separate from each other, or they may share one or more computer systems 100 (e.g. they may be implemented, at least in part, using one or more common servers). The protection system 220 and the control system 230 may, therefore, be together viewed as a protection and control system 240 (illustrated by a dotted line in FIG. 2a).

As mentioned, some embodiments of the invention may make use of an optional service system 250. The service system 250 may be arranged to communicate with the control system 230 over the network 270. The service system 250 and the control system 230 may communicate over the network 270 via any suitable communication mechanism/protocol in order to communicate data with each other. However, it will be appreciated that other communication scenarios are possible. Whilst FIG. 2a illustrates a single service system 250, it will be appreciated that there may be multiple service systems 250 and that FIG. 2a has been simplified for ease of illustration. The service system 250 may be, or may comprise, one or more computer systems 100 as described above with reference to FIG. 1. For example, the service system 250 may comprise one or more server computers.

Embodiments of the invention that make use of the service system 250 may also make use of an optional data repository (or data vault or database) 260 that is arranged to store various data 262. The data repository 260 may form part of the control system 230. The data repository 260 may form part of the service system 250. The data repository 260 may be separate from the control system 230 and separate from the service system 250. The control system 230 and/or the service system 250 may be arranged to store (or save or upload) data 262 in the data repository 260 and/or read (or access or obtain or download) data 262 from the data repository 260 via the network 270. However, the control system 230 and/or the service system 250 may be arranged to store (or save or upload) data 262 in the data repository 260 and/or read (or access or obtain or download) data 262 from the data repository 260 via a different network (such as a secured private network).

The client system 210 is arranged to execute a web browser 212 (such as Internet Explorer, Mozilla Firefox, Safari, Google Chrome, etc.). Web browsers are well-known and shall, therefore, not be described in detail herein. The browser 212 is a software application executed by the client system 210.

The browser 212 is arranged to obtain, or receive, a webpage 214 (e.g. from a website server/host, which could, for example, be the provider system 280). The webpage 214 typically comprises (or is encoded/written, at least in part, using) HTML code (such as HTML5 code) or code in some other markup language (such as XML). The browser 212 is arranged to process the webpage 214 and may, for example, output or render a display (or visual representation) of the webpage 214 (for example on a screen 120 of the client system 210). For this, the webpage 214 may comprise CSS (Cascading Style Sheets) code that describes how content of the webpage 214 (as encoded, for example, using HTML) is to be presented or displayed.

The webpage 214 may comprise, or may be arranged to execute or use, executable code 215 (or one or more scripts). The code 215 may, for example, be written in JavaScript (although it will be appreciated that other coding/scripting languages could be used, such as WebAssembly). The browser 212 may, therefore, support one or more coding/scripting languages (for example, the browser 212 may support JavaScript)—this means that the browser 212 is arranged, or is configured, to execute or run the code 215. This enables computer programs (as represented by the code 215) to be executed client-side rather than server-side (i.e. instead of a website host/server, such as the provider system 280, having to execute that code).

An operator of the client system 210 may be an attacker, in that the operator may wish to launch an attack against (or based on or using) the code 215. For example: the code 215 may contain secret information that the attacker wishes to obtain; the attacker may wish to use the code 215 to achieve functionality to which the attacker is not entitled or authorized, such as by circumventing or thwarting security checks; the attacker may wish to achieve new/alternative functionality not originally intended with the code 215; the attacker may wish to use the code 215 to try to gain unauthorized access to functionality or data from one or more servers (e.g. a server hosting a website associated with the webpage 214, the provider system 280 or the service system 250); etc.

The client system 210 and the browser 212 generally provide a so-called "white-box" environment for the execution of the code 215. Herein, a "white-box" environment is an execution environment for an item of software or a computer program (in this case the code 215) in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use or store secret information (e.g. one or more cryptographic keys or identifiers), where this information needs to remain hidden from, or unusable by, the attacker. The set-up, configuration and capabilities of both the client system 210 and the browser 212 are not necessarily known (or fully known) to, and/or are not controllable (or fully controllable) by, the provider of the webpage 214 (or another entity associated with the webpage 214 such as the service system 250), and so it can be assumed that the webpage 214 and its code 215 will be executing in a white-box environment. This is particularly true when the code 215 is written in a scripted or interpreted language such as JavaScript due to the human-readable nature of scripted or interpreted languages (as opposed to, say, compiled binary executable files)—the user of the client system 210 can view, monitor and modify execution of the code 215 (e.g. during interpretation or after just-in-time compilation within the browser 212), which makes it easy for an attacker to copy and modify the code 215 in an attempt to launch an attack against/using the code 215.

With that in mind, some or all of the code 215 of the webpage 214 is protected (or secured) code 216. The nature of, and operation of, the protected code 216 shall be described in more detail later.

It will be appreciated that, whilst the above has been described with reference to a webpage 214, in some embodiments, the browser 212 is arranged to execute a webapp 214 instead of a webpage 214. The concept of webapps is well-known and they shall, therefore, not be described in detail herein (but see, for example, https://en.wikipedia.org/wiki/Web_application, the entire disclosure of which is incorporated herein by reference). Therefore, whilst the following description makes reference to "webpage" 214, it will be appreciated that the description and embodiments set forth herein apply equally to using webapps 214 instead of webpages 214, where the webapp 214 comprises the code 215 (some or all of which is the protected code 216).

Figure 2B:
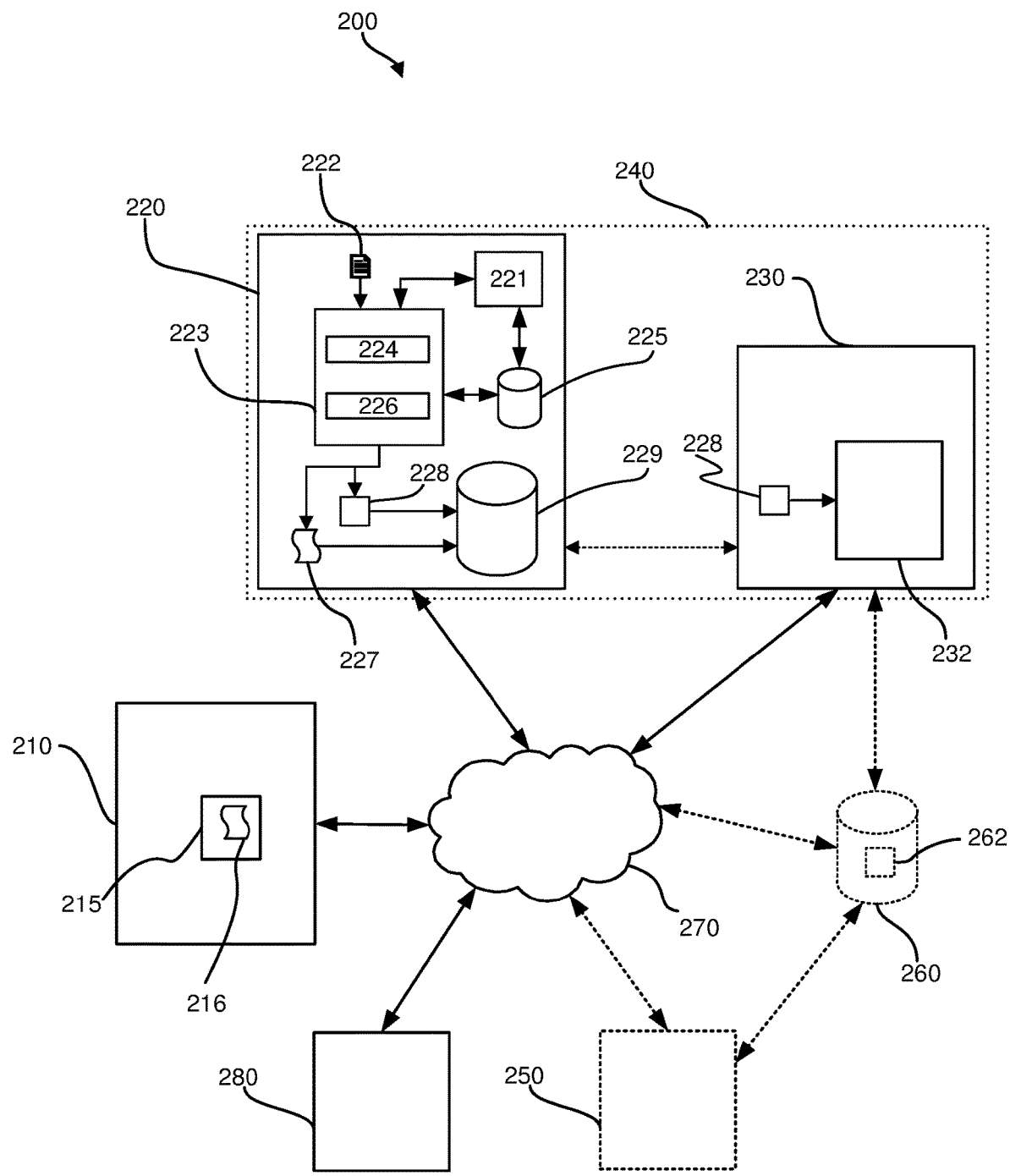

Moreover, in some embodiments, the client system 210 need not be executing a browser 212 and, instead of embodiments making use of webpages 214 or webapps 214, the client system 210 may be executing an application outside of the environment of a browser. Thus, it will be appreciated that the description and embodiments set forth herein apply equally to using applications 214 instead of webpages 214, where the application 214 comprises the code 215 (some or all of which is the protected code 216). FIG. 2b schematically illustrates such an example system 200 according to some embodiments of the invention. The system 200 of FIG. 2b is the same as the system 200 of FIG. 2a, except that the client system 210 is no longer using a browser 212 for processing a webpage 214 or a webapp 214—instead, the client system 210 is arranged to execute the code 215 of an application (including the protected code 216).

Figure 2C:
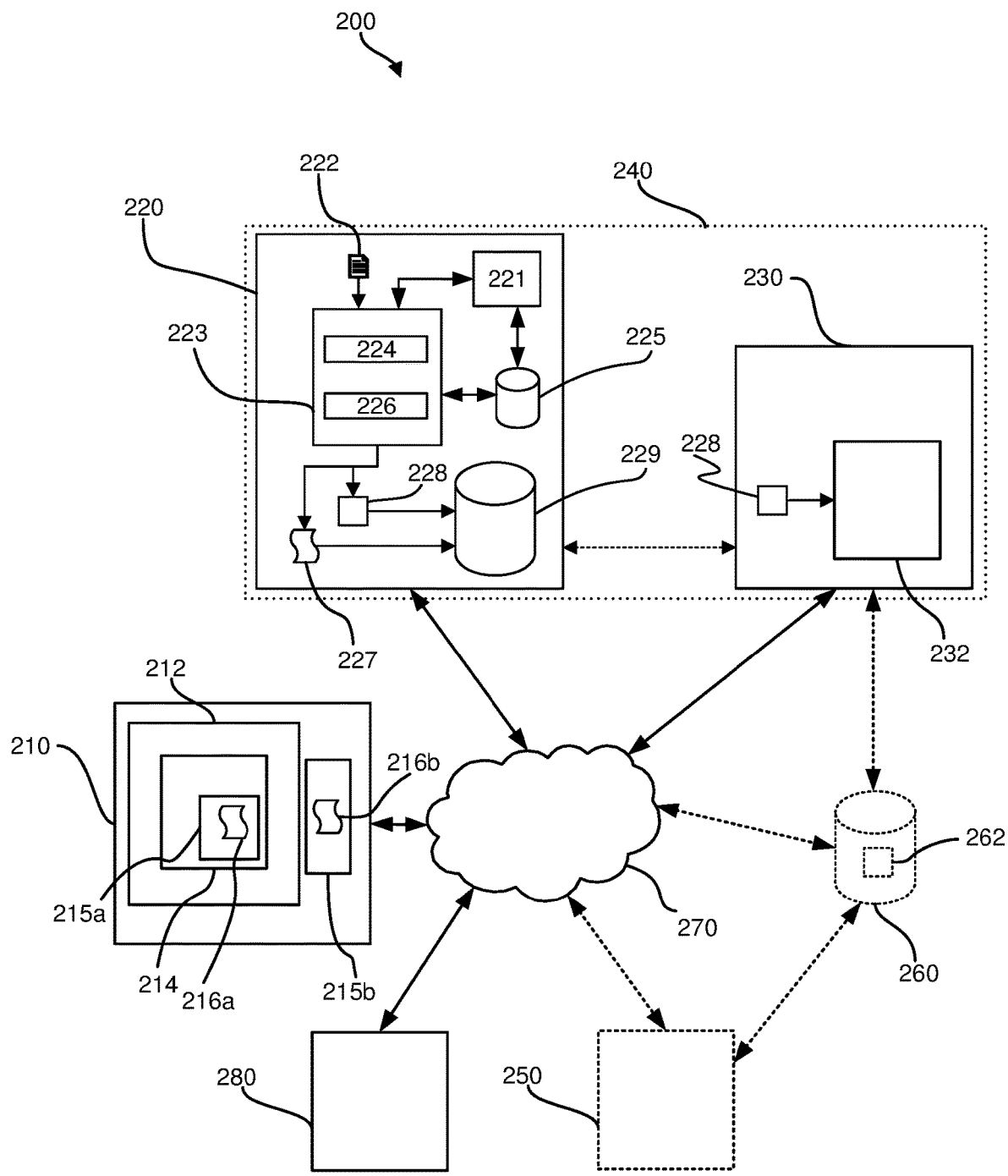

FIG. 2c schematically illustrates a further example system 200 according to some embodiments of the invention. The system 200 of FIG. 2c is the same as the system 200 of FIG. 2a, except that the client system 210 is additionally arranged to execute further code that comprises further protected code, in addition to the code of the webpage 214 or webapp 214. Thus, in FIG. 2c, the protected code 216 is shown as comprising protected code 216a and protected code 216b, where the protected code 216a is part of the code 215a of the webpage 214 or webapp 214 and the protected code 216b is part of code 215b that is not executed within the browser environment. The browser 212 may be a webview instead of providing full browser capabilities. Execution of the code 215*b* and/or the protected code 216*b* may cause the client system 210 to obtain or load the webpage 214 or webapp 214.

Thus, in the system 200 of FIG. 2*a*, the code 215 and the protected code 216 may be obtained when the webpage 214 is initially obtained or loaded, and/or may be dynamically loaded or obtained (for example in response to a user of the client system 210 clicking a link provided by the webpage 214 when displayed by the browser 212). In contrast, in the system 200 of FIG. 2*b*, the code 215 and the protected code 216 are in bytecode or binary form suitable for the native environment of the client system 210, and are obtained or loaded at the client system 210 prior to their execution (as opposed to possibly being dynamically obtained or loaded as in FIG. 2*a*)—for example, a user will select an application to be executed, thereby causing execution of the pre-installed code 215. Finally, in the system 200 of FIG. 2*c*, the code 215*a* and the protected code 216*a* may be obtained when the webpage 214 is initially obtained or loaded, and/or may be dynamically loaded or obtained (for example in response to a user of the client system 210 clicking a link provided by the webpage 214 when displayed by the browser 212), whilst the code 215*b* and the protected code 216*b* are in bytecode or binary form suitable for the native environment of the client system 210, and are obtained or loaded at the client system 210 prior to their execution (as opposed to possibly being dynamically obtained or loaded)—for example, a user will select an application to be executed, thereby causing execution of the pre-installed code 215*b*. Thus the system 200 of FIG. 2*c* may be viewed as a hybrid of the systems 200 of FIGS. 2*a* and 2*b*. It will be appreciated that other execution environments are possible and that embodiments of the invention are applicable in these and other such execution environments. Therefore, whilst embodiments of the invention shall be described with reference to the system 200 of FIG. 2*a*, it will be appreciated that embodiments of the invention are equally applicable to the systems 200 of FIGS. 2*b* and 2*c* and to other execution environments.

The control system 230 comprises, or is arranged to execute, a controller application 232. The controller application 232 and the protected code 216 are arranged to communicate with each other via the network 270. This typically operates in a client-server manner, in that the protected code 216 sends a request (or a message) to the controller application 232 and the controller application 232 provides a corresponding response (or reply message) back to the protected code 216. As shall be described in more detail later, the request may comprise various information that the controller application 232 can use to perform verification and/or authentication and/or other functionality. Similarly, as shall be described in more detail later, the reply may comprise various information that the protected code 216 (or the code 215 or the webpage 214) may use, some of which may enable, disable, modify, enhance or otherwise change functionality, operation or content of the protected code 216 (or the code 215 or the webpage 214). The reply may comprise information that the protected code 216 may use when forming a subsequent request to be sent to the control system 230 (an example of this is provided later). For example:

The response provided back to the protected code 216 may enable the code 215 and/or the webpage 214 to carry out their intended/normal functionality, i.e. provide the user of the client system 210 with the desired operation of the webpage 214—the controller application 232 may provide such a response if the verification and/or authentication and/or other functionality that it has performed identifies that the client system 210 should be allowed to access, or should be allowed to perform (or to continue to perform), the "normal" functionality provided by the code 215 and/or the webpage 214.

The response provided back to the protected code 216 may prohibit or prevent the code 215 and/or the webpage 214 from carrying out their intended/normal functionality, i.e. not providing the user of the client system 210 with the desired "normal" operation of the webpage 214—the controller application 232 may provide such a response if the verification and/or authentication and/or other functionality that it has performed identifies that the client system 210 should not be allowed to access, or should not be allowed to perform (or to continue to perform), the "normal" functionality provided by the code 215 and/or the webpage 214.

The response provided back to the protected code 216 may enable the code 215 and/or the webpage 214 to carry out their intended/normal functionality, i.e. provide the user of the client system 210 with the desired operation of the webpage 214, but may also cause the code 215 to carry out certain additional operations—the controller application 232 may provide such a response if the verification and/or authentication and/or other functionality that it has performed identifies that the client system 210 should be allowed to access, or should be allowed to perform (or to continue to perform), the "normal" functionality provided by the code 215 and/or the webpage 214, but that the certain additional operations also need to be performed (e.g. if security weaknesses or incorrect/inappropriate configurations/settings have been identified and, therefore, operations to resolve/address those weaknesses or configurations/settings need to be carried out).

The response provided back to the protected code 216 may enable the code 215 and/or the webpage 214 to carry out a modified version of their intended/normal functionality, i.e. provide the user of the client system 210 with the desired operation of the webpage 214 but in a modified way—the controller application 232 may provide such a response if the verification and/or authentication and/or other functionality that it has performed identifies that the client system 210 should be allowed to access, or should be allowed to perform (or to continue to perform), a variant of the "normal" functionality provided by the code 215 and/or the webpage 214.

The response provided back to the protected code 216 may cause the protected code 216 to operate in a different manner (e.g. carry out different functionality or supply different data the next time it sends a request to the control system 230). This could involve the response comprising configuration data for the protected code 216 to use and/or could involve the response comprising updated code to replace or supplement some or all of the protected code 216.

The response provided back to the protected code 216 may comprise information that enables, or configures, the protected code 216 to send a suitable request to the controller application 232 the next time that a request is to be sent.

It will be appreciated that other response scenarios are possible, as shall become apparent from the examples set out later.

In this way, the controller application 232 (and therefore the controller system 230) may be viewed as acting as one or more of: (i) a verifier, in that the controller application 232 may verify data in the request received from the protected code 216 against one or more security or access criteria or permissions, and/or against one or more other conditions, to work out whether or not the client system 210 should have access to, or be allowed to perform, the functionality provided by the code 215 and/or the webpage 214; (ii) an enforcer of these criteria, permissions and conditions, in that the response provided by the controller application 232 may prevent the client system 210 having access to, or being allowed to perform, the desired functionality of the code 215 and/or the webpage 214; and (iii) an enabler, in that the response provided by the controller application 232 may enable the client system 210 to have access to, or to perform, the desired (or a modified version of the desired) functionality of the code 215 and/or the webpage 214 or, indeed, some other functionality.

Figure 9:
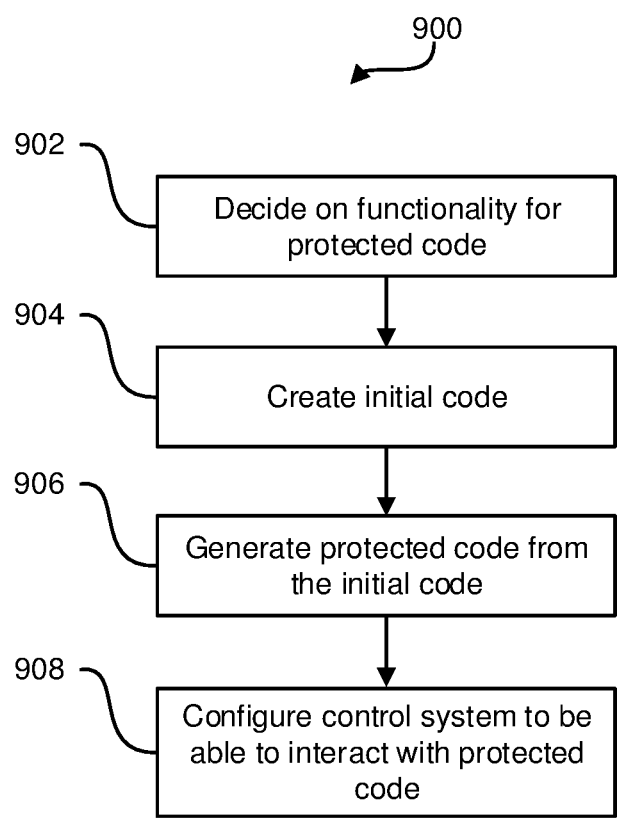
FIG. 9 is a flowchart illustrating a method for initially configuring or setting-up a system according to some embodiments of the invention.

The choice of how the protected code 216 and the controller application 232 interact (e.g. when the protected code 216 should send requests to the controller application 232; the information to be contained in those requests; the tests/processing to be performed by the controller application 232 based on those requests; the desired consequences of the various possible outcomes of the tests/processing by the controller application 232 and hence how the responses are to be formed; etc.) may be viewed as, or specified in, a security/configuration policy, as discussed later with respect to FIG. 9.

It is known for communications over the network 270 to be protected using network communication protection techniques, for example SSL (Secure Sockets Layer) and/or TLS (Transport Layer Security). However, to help avoid any vulnerabilities in SSL and/or in TLS that may be exploited by an attacker, the controller application 232 and the protected code 216 may be arranged to encrypt or transform some or all of the data that they send to each other, and similarly the controller application 232 and the protected code 216 may be arranged to decrypt (or de-transform) encrypted (or transformed) data that they receive from each other. This may be in addition to, or as an alternative to, using the protection provided by SSL and/or TLS and/or other network communication protection techniques. The encryption (or transformation) and decryption (or de-transformation) may make use of secret data (e.g. shared secret cryptographic keys, private cryptographic keys, unique identifiers, etc.)—the protected code 216 may be "protected" in that this secret data is stored in a secured manner within the webpage 214 (or within the code 215 or the protected code 216). This shall be described in more detail later.

In a similar way to the above encryption/decryption (or transformation/de-transformation), the controller application 232 and the protected code 216 may be arranged to perform additional or alternative cryptographic processing (such as signature application and verification, message authentication codes, etc.) on some or all of the data that they send to and/or receive from each other in order to protect/secure their communications. Again, this may make use of secret data (e.g. shared secret cryptographic keys, private cryptographic keys, unique identifiers, etc.) and the protected code 216 may be "protected" in that this secret data is stored in a secured manner within the webpage 214 (or within the code 215 or the protected code 216).

The processing performed by the controller application 232 may be based, at least in part, on metadata 228 that corresponds to the protected code 216. The nature of the metadata 228 and the processing involved shall be described later.

FIG. 3 is a flowchart illustrating an example method 300 of the interaction of the client system 210 and the control system 230 according to some embodiments of the invention.

At a step 302, the protected code 216 generates a request.

At a step 304, the protected code 216 sends the request to the control system 230. As described above, this may involve the protected code 216 encrypting and/or applying other cryptographic operations to some or all of the data of the request in order to secure the request. The (secured) request may then be communicated to the control system 230 via the network 270.

At a step 306, the control system 230 (and, in particular, the controller application 232 of the control system 230) receives the request sent by the protected code 216. As described above, this may involve the controller application 232 decrypting and/or applying other cryptographic operations to some or all of the data of the received request.

At a step 308, the controller application 232 processes the received request and generates a response.

At a step 310, the controller application 232 sends the response to the client system 210. As described above, this may involve the controller application 232 encrypting and/or applying other cryptographic operations to some or all of the data of the response in order to secure the response. The (secured) response may then be communicated to the client system 210 via the network 270.

At a step 312, the client system 210 (and, in particular, the protected code 216 being executed) receives the response sent by the controller application 232. As described above, this may involve the protected code 216 decrypting and/or applying other cryptographic operations to some or all of the data of the received response.

At a step 314, the protected code 216 processes the received response.

The protected code 216 may be arranged to interact with the controller application 232 at different points in time or at different stages, e.g.:
- Once (e.g. when the browser 212 begins processing the webpage 214).
- At multiple different times, e.g. based on some (potentially regular) time scheduling for repeated interaction with the controller application 232. This helps ensure that the controller application 232 can regularly check the status of the webpage 214.
- At multiple different stages of user interaction with the webpage 214, e.g. whenever some or all functionality is carried out or is requested (such as when a user of the client system 210 clicks a button, or otherwise interacts with a control, of the webpage 214) and/or whenever the webpage 214 requires further information (e.g. information from the provider system 280 or from the service system 250).

It will, therefore, be appreciated that the method 300 may be repeated multiple times. Thus, the protected code 216 may generate a sequence (or series) of requests $R_i$ (i=1, 2, . . . ) and the controller application 232 may generate a corresponding sequence (or series) of responses $S_i$ (i=1, 2, . . . ), where, for i=1, 2, . . . , the $i^{th}$ response $S_i$ is generated by the controller application 232 at the step 308 in response to, and based at least in part on, the $i^{th}$ request $R_i$ generated by the protected code 216 at the step 302.

In some embodiments (examples of which are set out below), one or more of the requests $R_{i+1}$ (i=1, 2, . . . ) is generated using, or based at least in part on, some data or information contained in one or more preceding responses $S_k$ (for some k≤i)—preferably, in such embodiments, the requests $R_{i+1}$ (i=1, 2, . . . ) are generated using, or based at least in part on, some data or information contained in the immediately preceding responses $S_i$. This helps the controller application 232 maintain control of the operation of the protected code 216 (or the code 215 or the webpage 214) at the client system 210. In such embodiments, the initial request $R_1$ may be based on default data or information already stored within, or as part of, the protected code 216 (or the code 215 or the webpage 214).

Some examples of the interaction of the protected code 216 and the controller application 232 according to the method 300 are set out below. These examples may be used separately from each other or two or more of them may be implemented together.

Example 1

The protected code 216 in the webpage 214 may be a unique instance of that code 216, insofar as one or both of the following may apply:

(i) If a different client system 210 obtained the webpage 214 then that different client system 210 would receive or obtain a different version or instance of the protected code 216. However, it will be appreciated that unique/different instances of the protected code 216 may be provided to groups of client systems 210, i.e. for a population of client systems 210, there may be subsets of client systems 210 where each client system 210 in a subset receives the same particular instance of the protected code 216, but different subsets receive different instances of the protected code 216. These subsets may be predetermined or may be dynamically established. Put another way, the same instance or protected code 216 may be reused (or provided) multiple times—the number of times an instance of protected code 216 is reused may be predetermined or may vary from instance to instance (e.g. as a randomly generated value, possibly bounded above by some predetermined maximum threshold).

(ii) If the same client system 210 obtained the webpage 214 a subsequent time, then the webpage 214 obtained that subsequent time may comprise or use a different version or instance of the protected code 216. However, it will be appreciated that a different version or instance of the protected code 216 need not necessarily be obtained each time that webpage 214 is obtained—for example (a) a client system 210 may obtain a different version or instance of the protected code 216 only every $W^{th}$ time that the webpage 214 is obtained (where W may be predetermined, may be randomly generated, and may change after the client system 210 has obtained a different version or instance of the protected code 216, or may be otherwise controllable by the control system 230); and/or (b) if the client system 210 (or operator of the client system) is suspected of launching an attack or misusing the webpage 214, then the decision on whether or not the client system 210 should obtain a different version or instance of the protected code 216 may be based on how such a suspected attack/misuse is to be handled (e.g. to enable further investigation, to try to thwart the attack/misuse, or some other consideration/criteria)—for example, if the attacker's current attack has not progressed very far, then the same version of the protected code 216 may be provided to the client system 210, whereas if the attacker's current attack is progressing well or has been successful, then a different version of the protected code 216 may be provided to the client system 210.

Thus, the instance of the protected code 216 may be unique for each time (or for certain times) the webpage 214 is obtained and/or may be unique to a particular client system 210 (or group of client systems 210) and/or may be unique to a particular instance of the browser 212, etc.

The decision on which instance of the protected code 216 to provide to the client system 210 is, preferably, made by the control system 230 (or the controller application 232). As set out below, the client system 210 may obtain the protected code 216 from the control system 210; in other embodiments, the client system 210 may obtain the protected code 216 from the protection system 220 or the provider system 280, in which case the protection system 220 or the provider system 280 (as applicable) may communicate with the control system 230 so that the control system 230 can decide on which instance of the protected code 216 should be provided to the client system 210 and inform the protection system 220 or the provider system 280 accordingly.

The protected code 216 may, therefore, comprise functionality to identify (or help identify) itself to the controller application 232, i.e. to inform the controller application 232 of (or at least help the controller application 232 determine) an identification of which particular instance of the protected code 216 is currently being used at the client system 210.

For example, there may be stored, in a secured manner, an identifier for the particular instance of the protected code 216 within the protected code 216 (or within the code 215 or the webpage 214). The step 302 may, therefore, comprise accessing or obtaining that stored identifier and providing or including the accessed/obtained identifier as part of the request—i.e. at least part of the data making up the request may be indicative of an identity of the particular instance of the protected code 216. The step 308 may then comprise the controller application 232 accessing or obtaining the identifier, included in the request, for the particular instance of the protected code 216 of the webpage 214.

Alternatively, the step 302 may comprise the protected code 216 obtaining information or data that forms part of (or that is derived from) the webpage 214 and/or the code 215 and/or the protected code 216 (e.g. selected parts/bits of the webpage 214 and/or the code 215 and/or the protected code 216), from which an identifier of the particular instance of the protected code 216 may be derived, and including the accessed/obtained information or data as part of the request. The step 308 may then comprise the controller application 232 using this information or data received in the request to derive an identifier for the particular instance of the protected code 216 within the webpage 214.

This enables the controller application 232 to know, with a degree of certainty, exactly which client system 210 and/or user and/or instance of the protected code 216 the controller application 232 is currently interacting with.

The processing performed at the step 308 may be based, at least in part, on which particular instance of the protected code 216 sent the request (i.e. based on the identifier for the particular instance), in which case the processing performed at the step 308 may make use of metadata 228 associated with (or corresponding to) the particular instance of the protected code 216. Thus, the step 308 may involve the controller application 232 obtaining or accessing metadata 228 associated with the particular instance of the protected code 216 identified by the identifier. Examples of the use of the metadata 228 shall be set out later.

Example 2

The step 302 may involve the protected code 216 performing one or more checks or tests, and including data representing the outcome of those one or more checks or tests within the request. For example:

Integrity verification: The step 302 may comprise the protected code 216 identifying or determining whether one or more of the protected code 216, the code 215 and the webpage 214 have been modified and including modification data in the request that indicates whether or not such a modification has occurred. The step 308 may then comprise the controller application 232 accessing or obtaining the modification data included in the request.

Anti-debug operations: The step 302 may comprise the protected code 216 identifying or determining whether or not the code 215 and/or the protected code 216 is being run within a debugger and including anti-debug data in the request that indicates that (or whether or not) the code 215 and/or the protected code 216 is being run within a debugger. It will be appreciated that the protected code 216 may be arranged to identify or determine whether or not the code 215 and/or the protected code 216 is being run within a debugger as an on-going process (e.g. via some background thread)—i.e. not just when the step 302 is performed—in order to generate/maintain a corresponding indicator that represents whether or not the code 215 and/or the protected code 216 is being run within a debugger. The step 302 may, therefore, comprise generating a request that comprises (or that is based on) this indicator; additionally or alternatively, the step 302 may be instigated by the on-going process in response to an identification or determination that the code 215 and/or the protected code 216 is being run within a debugger. The step 308 may then comprise the controller application 232 accessing or obtaining the anti-debug data included in the request. It will be appreciated that the term "debugger" as used herein may refer to a development mode of the browser 212 or any other facility by which the user of the client system 210 may monitor and/or control execution of some or all of the code 215.

Watch identification: The step 302 may comprise the protected code 216 identifying or determining whether or not data of the webpage (e.g. as presented by a visual representation of the webpage 214) is being copied from the visual representation or from within the webpage 214 and including watch data in the request that indicates that (or whether or not) such copying is occurring. It will be appreciated that the protected code 216 may be arranged to identify or determine whether such copying is being performed as an on-going process (e.g. via some background thread)—i.e. not just when the step 302 is performed—in order to generate/maintain a corresponding indicator that represents whether or not such copying is being performed. The step 302 may, therefore, comprise generating a request that comprises (or that is based on) this indicator; additionally or alternatively, the step 302 may be instigated by the on-going process in response to an identification or determination that such copying is being performed. The step 308 may then comprise the controller application 232 accessing or obtaining the watch data included in the request.

Validation checking: The step 302 may comprise the protected code 216 identifying or determining whether or not whether validation of data fields of the displayed webpage 214 is turned on or off within the browser 212 and including validation-checking data in the request that indicates that (or whether or not) validation of data fields of the displayed webpage 214 is turned on or off within the browser 212. It will be appreciated that the protected code 216 may be arranged to identify or determine whether or not validation of data fields of the displayed webpage 214 is turned on or off as an on-going process (e.g. via some background thread)—i.e. not just when the step 302 is performed—in order to generate/maintain a corresponding indicator that represents whether or not validation of data fields of the displayed webpage 214 is turned on or off. The step 302 may, therefore, comprise generating a request that comprises (or that is based on) this indicator; additionally or alternatively, the step 302 may be instigated by the on-going process in response to an identification or determination that validation of data fields of the displayed webpage 214 is turned on or off. The step 308 may then comprise the controller application 232 accessing or obtaining the validation-checking data included in the request.

Advertisement-blocking checking: The step 302 may comprise the protected code 216 identifying or determining whether the blocking of advertisements (e.g. advertisements provided by the webpage 214) is turned on or off within the browser 212 and including advertisement-blocking-checking data in the request that indicates that (or whether or not) the blocking of advertisements (e.g. advertisements provided by the webpage 214) is turned on or off within the browser 212. It will be appreciated that the protected code 216 may be arranged to identify or determine whether advertisement blocking is being performed as an on-going process (e.g. via some background thread)—i.e. not just when the step 302 is performed—in order to generate/maintain a corresponding indicator that represents whether or not advertisement blocking is being performed. The step 302 may, therefore, comprise generating a request that comprises (or that is based on) this indicator; additionally or alternatively, the step 302 may be instigated by the on-going process in response to an identification or determination that advertisement blocking is being performed. The step 308 may then comprise the controller application 232 accessing or obtaining the advertisement-blocking-checking data included in the request.

Alternatively, for one or more of the above checks or tests, the step 302 may comprise the protected code 216 obtaining (or accessing or deriving) information or data from the protected code 216 and/or the code 215 and/or the webpage 214 and/or the browser 212 and/or the execution environment of the browser 212 that enables that check or test to be carried out, and including that obtained information or data in the request. The step 308 may then comprise the controller application 232 performing that check or test itself (instead of the check or test being performed by the protected code 216), e.g. to derive one or more of the above-mentioned modification data, anti-debug data, watch data, validation-checking data and advertisement-blocking-checking data.

It will be appreciated that the step 302 may comprise performing additional or alternative functionality (or logic or processing) to thereby generate a request that is to be sent to the control system 230—such functionality may depend on the nature/functionality of the webpage 214 and/or the security policy that has been established for the webpage 214 and/or other criteria/considerations.

The response generated at the step 308 depends on the outcome of the checks and tests. The generation of the response may also be configured by the provider or creator of the webpage 214 (e.g. some sources of webpages 214 may want strict security controls, whereas sources of other webpages 214 may be content with imposing less strict security control). This could be specified, for example, as part of the above-mentioned security/configuration policy. Examples of responses could include:

- If modification data indicates that one or more of the protected code 216, the code 215 and the webpage 214 have been modified, then the response may be arranged to prevent the client system 210 from accessing content of, or performing the "normal" functionality provided by, the code 215 and/or the webpage 214. This could be achieved by the response causing (at the step 314), the code 215 or the protected code 216 to carry out certain exception handling, for example closing the browser 212, pausing display of video content of the webpage 214, stopping the browser 212 from displaying the webpage 214, etc. Alternatively, this could be achieved by the response containing dummy (e.g. random) data which the code 215 or the protected code 216 processes and that results in the output of the webpage 214 being meaningless, or unintelligible, to the user of the client system 210.
- If anti-debug data indicates that the code 215 and/or the protected code 216 is being run within a debugger, then the response may be arranged to (a) prevent the client system 210 from accessing content of, or performing the "normal" functionality provided by, the code 215 and/or the webpage 214 (e.g. as discussed above) or (b) cause (at the step 314) the code 215 and/or the protected code 216 to disable the debugger.
- If watch data indicates that data of the webpage (e.g. as presented by a visual representation of the webpage 214) is being copied from the visual representation or from within the webpage 214, then the response may be arranged to (a) prevent the client system 210 from accessing content of, or performing the "normal" functionality provided by, the code 215 and/or the webpage 214 (e.g. as discussed above) or (b) cause (at the step 314) the code 215 and/or the protected code 216 to implement operations or functionality that result in prevention of such copying.
- If validation-checking data indicates that validation of data fields of the displayed webpage 214 is turned off, or somehow disabled, within the browser 212 or the webpage 214, then the response may be arranged to (a) prevent the client system 210 from accessing content of, or performing the "normal" functionality provided by, the code 215 and/or the webpage 214 (e.g. as discussed above) or (b) cause (at the step 314) the code 215 and/or the protected code 216 to configure the browser 212 so that validation of data fields of the displayed webpage 214 is turned on.
- If advertisement-blocking-checking data indicates that blocking of advertisements (e.g. advertisements provided by the webpage 214) is turned on or off within the browser 212, then the response may be arranged to (a) prevent the client system 210 from accessing content of, or performing the "normal" functionality provided by, the code 215 and/or the webpage 214 (e.g. as discussed above) or (b) cause (at the step 314) the code 215 and/or the protected code 216 to configure the browser 212 to reverse the current setting of advertisement blocking.
- Otherwise, the response may be arranged to allow the client system 210 to access content of, or perform the "normal" functionality provided by, the code 215 and/ or the webpage 214 (absent, of course, any other reason to allow this to happen based on any other tests that might have been performed). The processing of the response at the step 314 may, therefore, simply be for the protected code 216 to allow the client system 210 to access content of, or perform the "normal" functionality provided by, the code 215 and/or the webpage 214.

More detail on the above examples shall be provided later.

The processing of a response at the step 308 may include the controller application 232 logging or storing data in (or based on) the received request, such as one or more of the above-mentioned modification data, anti-debug data, watch data, validation-checking data, advertisement-blocking-checking data, etc. Such logs or stored data can be used later for subsequent analysis (e.g. to help identify if and/or how and/or when and/or by whom an attack on, or misuse of, the webpage 214 is being performed) and/or for subsequent enforcement of protections and/or as evidence for subsequent legal proceedings.

As mentioned above, the choice of how the protected code 216 and the controller application 232 interact (e.g. when and how an identity of the protected code 216 is to be obtained; when and how some or all of the above tests, such as integrity verification, and their corresponding responses should be implemented and enforced; etc.) may be viewed as, or specified in, a security/configuration policy.

Thus, as set out above, the method 300 (i.e. the operations performed by the protected code 216 and the controller application 232) secure the (normal/intended) functionality provided by the webpage 214 (or webapp 214 or application 214). For webpages 214 or webapps 214, this functionality is provided via the browser 212 (i.e. via the browser 212 processing the webpage 214 or the webapp 214). Put another way, the method 300 (i.e. the operations performed by the protected code 216 and the controller application 232) secure the webpage 214 (or webapp 214 or application 214) processed by the browser 212.

The protection system 220 is arranged to produce protected (or secured) code 227 based on initial code 222. The initial code 222 and the protected code 227 may each comprise one or more computer programs (or software or modules) that may be stored as one or more files. Each file can contain one or more functions.

The initial code 222 may comprise source code written in one or more languages, one or more of which may be the same as the language(s) for the protected code 216, although this is not necessary. The initial code 222 may comprise compiled/executable code and/or source code.

The protection system 220 comprises, or is arranged to execute, a protection application 223. The protection system 220 may also comprise or implement a database 229 (or store).

The protection system 220 may also comprise, or may be arranged to execute, a library application 221, and may comprise or implement a library database 225 (or store).

In summary, the protection application 223 receives the initial code 222 and applies one or more "protections" to the initial code 222 to thereby generate and output the protected code 227. Thus, the protection application 223 comprises one or more protector modules or components 224 that is/are arranged to apply one or more "protections" to the initial code 222 (as shall be described in more detail shortly). One of these protections may involve generating different instances of code or software—these different instances provide the same overall functionality as each other, but have differences in their respective software instructions and/or differences in their data. These differences can be used to identify a specific instance and/or control operation or functioning of specific instances. Generation of different instances (also referred to as "diversification") shall be described in more detail shortly. The protection application 223 also comprises a metadata generator 226 that is arranged to generate metadata 228 corresponding to, or associated with, the protected code 227 that the protection application 223 generates—the nature and use of the metadata 228 shall be described in more detail later.

As mentioned, the protection system 220 may comprise a database 229 (or store). The protection system 220 may store the protected code 227 and the associated metadata 228 generated by the protection application 223 in the database 229. In this way, the protection system 220 may create a repository of multiple different protected code 227 and their associated metadata 228, e.g. storing multiple different (or unique) protected instances of the same initial code 222, with this being done respectively for one or more separate amounts of initial code 222. Therefore, when protected code 227 is required, the protection system 220 may already have a "reserve" of available protected code 227 that can be used/supplied. However, it will be appreciated that, in alternative embodiments, protected code 227 and its associated metadata 228 may be generated as and when needed (i.e. on demand).

The aim of the protector module(s) 224 is to protect (or secure) the functionality or data processing of the initial code 222 and/or to protect (or secure) data used or processed or stored by the initial code 222. This can be achieved by applying a variety of software protection techniques (referred to herein as "protections"), such as one or more of cloaking techniques, homomorphic data transformation, control flow transformation, white-box cryptography, key hiding, program interlocking and boundary blending.

In particular, the protected code 227 (i.e. initial code 222 after being processed by the protector module(s) 224) will provide at least the same functionality or data processing as the initial code 222. However, this functionality or data processing is typically implemented in the protected code 227 in a manner such that an operator of a computer system 100 executing the protected code 227 cannot access or use this functionality or data processing from the protected code 227 in an unintended or unauthorised manner, whereas if that computer system 100 were to execute the initial code 222 instead (i.e. in an unprotected form), then the operator of the computer system 100 might have been able to launch a successful attack and thereby access or use the functionality or data processing in an unintended or unauthorised manner. Similarly, the protected code 227 may, due to processing by the protector module(s) 224, store or be able to access secret information (such as a cryptographic key or an identifier) in a protected or obfuscated manner to thereby make it more difficult (if not impossible) for an attacker to deduce or access that secret information (whereas such information may have been deducible or accessible from the initial code 222 without the protections having been applied).

For example:

The initial code 222 may comprise a decision (or a decision block or a branch point) that is based, at least in part, on one or more items of data to be processed by the initial code 222. If the initial code 222 were executed in its unprotected form, then an attacker may be able to force the initial code 222 to execute so that a path of execution is followed after processing the decision even though that path of execution were not meant to have been followed. For example, the decision may comprise testing whether a program variable B is TRUE or FALSE, and the initial code 222 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger or by rewriting the initial code 222) force the initial code 222 to follow path $P_F$ if the decision identified that B is TRUE and/or force the initial code 222 to follow path $P_T$ if the decision identified that B is FALSE. Therefore, in some embodiments, the protector module(s) 224 aim to prevent (or at least make it more difficult) for the attacker to do this by applying one or more software protection techniques to the decision within the initial code 222.

The initial code 222 may comprise one or more of a security-related function; an access-control function; a cryptographic function; and a rights-management function. Such functions often involve the use of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, the protector module(s) 224 aim to prevent (or at least make it more difficult) for the attacker to identify or determine the one or more pieces of secret data by applying one or more software protection techniques to such functions within the initial code 222. This may involve arranging the protected code 227 so that it stores secret data in an obfuscated manner within the protected code 227 itself. Additionally or alternatively, this may involve arranging the protected code 227 with functionality to be able to dynamically read and write secret data in an obfuscated or encrypted form to/from a memory.

The protected code 227 may comprise additional functionality (i.e. functionality not originally in the initial code 222). This additional functionality may be included into the initial code 222 to help form the protected code 227 by the protector module(s) 224. This additional functionality may be to enable the protected code 227 to carry out the steps 302, 304, 312 and 314 of the method 300 of FIG. 3. In this way, the protected code 227 may be used as protected code 216 within the webpage 214.

As discussed above, the client system 210 and the browser 212 generally provide a so-called "white-box" execution environment. There are numerous techniques, referred to herein as "white-box obfuscation techniques", for transforming the initial code 222 so that it is resistant to white-box attacks (i.e. attacks that try to exploit the fact that the execution environment is a white-box environment). Examples of such white-box obfuscation techniques can be found, in "*White-Box Cryptography and an AES Implementation*", S. Chow et al, Selected Areas in Cryptography, 9$^{th}$ Annual International Workshop, SAC 2002, Lecture Notes in Computer Science 2595 (2003), p 250-270 and "*A White-box DES Implementation for DRM Applications*", S. Chow et al, Digital Rights Management, ACM CCS-9 Workshop, DRM 2002, Lecture Notes in Computer Science 2696 (2003), p 1-15, the entire disclosures of which are incorporated herein by reference. Additional examples can be found in US61/055,694 and WO2009/140774, the entire disclosures of which are incorporated herein by reference. Some white-box obfuscation techniques (such as those described above and others set out below) enable storage and/or use, and possibly manipulation of, secret/sensitive data (such as cryptographic keys) in a transformed/secured manner from which it is difficult/impossible for an attacker to access or derive the underlying secret/sensitive data. Some white-box obfuscation techniques implement data flow obfuscation—see, for example, U.S. Pat. Nos. 7,350,085, 7,397,916, 6,594,761 and 6,842,862, the entire disclosures of which are incorporated herein by reference. Some white-box obfuscation techniques implement control flow obfuscation—see, for example, U.S. Pat. Nos. 6,779,114, 6,594,761 and 6,842,862 the entire disclosures of which are incorporated herein by reference. However, it will be appreciated that other white-box obfuscation techniques exist and that embodiments of the invention may use any white-box obfuscation techniques.

As another example, it is possible that the initial code 222 may be intended to be provided (or distributed) to, and used by, a particular client system 210 (or a particular set of client systems 210) and that it is, therefore, desirable to "lock" the initial code 222 to the particular client system(s) 210, i.e. to prevent the initial code 222 (once protected) from executing on another client system 210. Consequently, there are numerous techniques, referred to herein as "node-locking" protection techniques, for transforming the initial code 222 so that the protected code 227 can execute on (or be executed by) one or more predetermined/specific client systems 210 but will not execute on other client systems 210. Examples of such node-locking techniques can be found in WO2012/126077, the entire disclosure of which is incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software. Examples of such software watermarking techniques can be found in U.S. Pat. No. 7,395,433, the entire disclosure of which is incorporated herein by reference. However, it will be appreciated that other software watermarking techniques exist and that embodiments of the invention may use any software watermarking techniques.

As mentioned above, it may be desirable to provide different versions or instances of the initial code 222 to different client systems 210. The different versions of the initial code 222 provide the same functionality—however, the different versions of the initial code 222 are programmed or implemented differently. This may help limit the impact of an attacker successfully attacking the protected code 227. In particular, if an attacker successfully attacks his version of the protected code 227, then that attack (or data, such as cryptographic keys, discovered or accessed by that attack) may not be suitable for use with different versions of the protected code 227. Similarly, having different protected instances 227 of the initial code 222 helps identify specific users (e.g. specific client systems 210) of the protected code 227. Consequently, there are numerous techniques, referred to herein as "diversity" techniques, for transforming the initial code 222 so that different, protected versions of the initial code 222 are generated (i.e. so that "diversity" is introduced). Examples of such diversity techniques can be found in WO2011/120123, the entire disclosure of which is incorporated herein by reference. However, it will be appreciated that other diversity techniques exist and that embodiments of the invention may use any diversity techniques.

The above-mentioned white-box obfuscation techniques, node-locking techniques, software watermarking techniques and diversity techniques are examples of software protection techniques. It will be appreciated that there are other methods of applying protection to the initial code 222. Thus, the term "software protection techniques", or "protections" as used herein shall be taken to mean any method of applying protection to the initial code 222 (with the aim of thwarting attacks by an attacker, or at least making it more difficult for an attacker to be successful with his attacks), such as any one or more of the above-mentioned white-box obfuscation techniques and/or any one or more of the above-mentioned node-locking techniques and/or any one or more of the above-mentioned software watermarking techniques and/or any one or more of the above-mentioned diversity techniques. The protector module(s) 240 may, therefore, be arranged to apply any one or more of the above-mentioned software protection techniques or protections to the initial code 222 to generate the protected code 227. The resultant protected code 227 may, therefore, be referred to as "white-box protected code".

There are numerous ways in which the protector module(s) 224 may implement the above-mentioned software protection techniques within the initial code 222. For example, to protect the initial code 222, the protector module(s) 224 may modify one or more portions of code within the initial code 222 and/or may add or introduce one or more new portions of code into the initial code 222. The actual way in which these modifications are made or the actual way in which the new portions of code are written can, of course, vary—there are, after all, numerous ways of writing software to achieve the same functionality.

Numerous examples and methods for implementing the protector module(s) 224 so as to generate protected code 227 from initial code 222 can be found, for example, in WO2015/150391 and WO2015/150376, the entire disclosures of which are incorporated herein by reference. Further examples of protection techniques that the protector module(s) 224 may be arranged to apply can be found in WO2013/142981, WO2013/142979, WO2013/142983 and WO2013/142980, the entire disclosures of which are incorporated herein by reference.

As mentioned above, the protection system 220 may comprise or implement a library database 225 (or store). The library database 225 may comprise one or more pre-generated protected software modules (or functions or procedures or code snippets), and potentially multiple differently implemented/protected instances for the same underlying functionality/code. These modules are "pre-generated" insofar as they are generated independently of, and potentially prior to receipt of, the initial code 222. This library database 225 may, therefore, be viewed as a repository available to the protection application 223, so that the protection application 223 (or one or more of the protector modules or components 224) can use, or include within the protected code 227, one or more of the modules stored within the library database 225. To this end, the protection system 220 may be arranged to execute the library application 221—the library application 221 may generate the software modules stored in the library database 225. An example of such a library application 221 to generate protected modules is described in WO2015/150376, the entire disclosure of which is incorporated herein by reference. The protection application 223 may be arranged to obtain software modules directly from the library database 225 or may be arranged to obtain software modules from the library database 225 via the library application 221. It will be appreciated that the library application 221 may be part of, and may be executed by, an entity other than the protection system 220. Similarly, it will be appreciated that the library database 225 may be part of, and may be provided by, an entity other than the protection system 220. The library database 225 may form part of the database 229.

Figure 4:
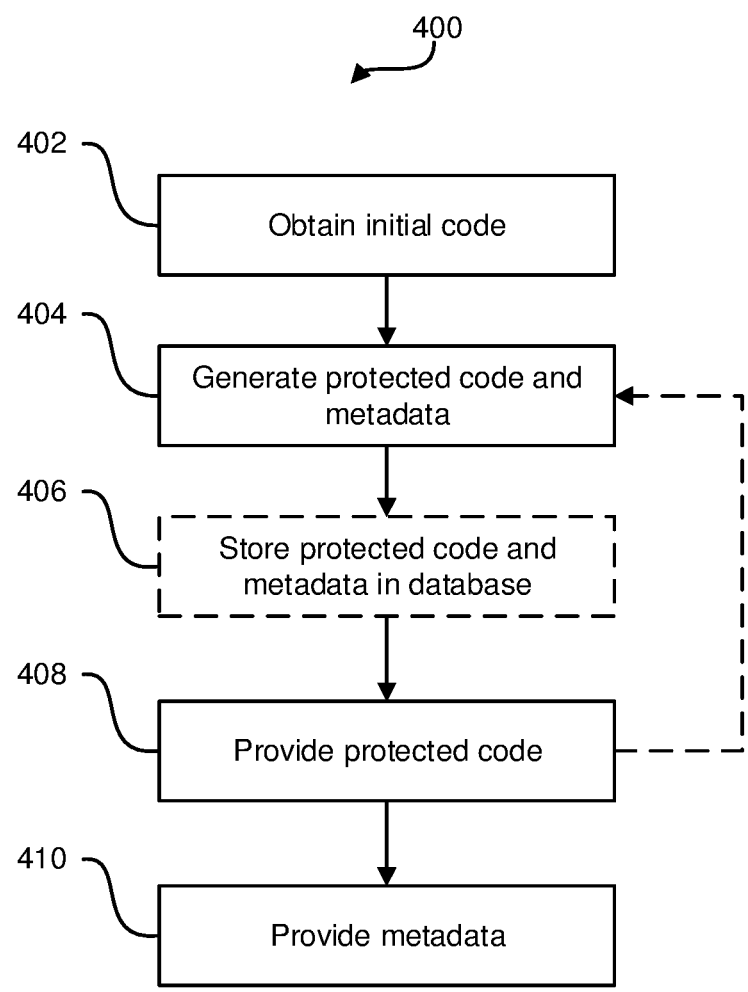
FIG. 4 is a flowchart illustrating an example method of operating a protection system according to some embodiments of the invention.

FIG. 4 is a flowchart illustrating an example method 400 of operating the protection system 220 according to some embodiments of the invention.

At a step 402, the protection system 220 obtains the initial code 222. This may comprise the protection system 220 receiving the initial code 222 from a different entity (e.g. from a provider/host of a website associated with the webpage 214, such as the provider system 280)—the initial code 222 may, therefore, comprise some or all of the code 215 and/or the protected code 216 (albeit in an unprotected form). Alternatively, this may comprise the protection system 220 generating the initial code 222 (e.g. if the protection system 220 is being operated by an entity that generates and protects its own code).

At a step 404, the protection system 220 uses the protection application 223 to generate, from the obtained initial code 222, the protected code 227 and metadata 228 associated with the protected code 227. This may include: (a) including one or more modules or code (e.g. code from the library database 221) into the initial code 222 to enable the protected code 227 to carry out the steps 302, 304, 312 and 314 of FIG. 3 and/or (b) applying one or more of the above-mentioned software protection techniques. Methods for achieving this have been discussed above. As mentioned, this may involve generating multiple different protected instances or versions 227 of the initial code 222 (each instance or version having respective associated metadata 228).

At an optional step 406, the protection system 220 may store some or all of the protected code 227 and/or the metadata 228 in the database 229. The step 404 may, therefore, be carried out in anticipation of there being a need for one or more instances of the protected code 227, so that the database 229 can store protected code 227 and metadata 228 in advance, ready for being provided as and when needed (thereby reducing delay of provisioning protected code 227). However, the database 229 is optional, so that the protection system 220 may generate the protected code 227 and the metadata 228 as and when it is needed or requested (i.e. on demand).

At a step 408, the protected code 227 is provided to a requesting entity (for example the provider system 280). The protection system 220 may receive a request for the protected code 227 (or for an instance of the protected code 227). If, as discussed above, the protection system 220 is arranged to generate the protected code 227 and the metadata 228 as and when it is needed or requested (i.e. on demand), then the receipt of the request may cause the protection system 220 to carry out the step 404 and provide (at the step 408), to the requesting entity, the protected code 227 that was generated at the step 404 in response to the request. If, on the other hand, the protection system 220 is arranged to maintain a repository of (instances of) protected code 227 and metadata 228 in the database 229, then the receipt of the request may cause the protection system 220 to provide (an instance of) the protected code 227 stored in the database 229 to the requesting entity. The protection system 220 may then also be arranged to generate, and store in the database 229, one or more additional (instances of) protected code 227 and metadata 228 in response to provision of (an instance of) the protected code 227 from the database 229—in this way, the database 229 may be maintained with a sufficient buffer of instances of the protected code 227.

At a step 410, the protection system 220 may provide the metadata 228 associated with (an instance of) the protected code 227 to the control system 230. In particular, the control system 230 may send a request to the protection system 220, where this request identifies particular protected code 227 (or a particular instance of particular protected code 227) and, in response to that request, the protection system 220 may send a reply to the control system 230 that comprises the metadata 228 associated with the identified protected code 227 (or that comprises data, e.g. a URL, that enables the control system 230 to access and obtain that metadata 228). One or both of the request and response may be communicated via the network 270. Alternatively, one or both of the request and response may be communicated via a different network (such as a secured private network).

The step 410 may be performed at the same time, or as part of, the step 408. For example, if the protection system 220 stores (at the step 406) some protected code 227 and its associated metadata 228 in the database 229, then the steps 408 and 410 may comprise providing the protected code 227 and its associated metadata 228 from the database 229.

The protection application 223 may, in addition to receiving the initial code 222 as an input, also receive some or all of (a) the code 215 (that is not protected/secured) and/or (b) some of all of webpage 214 other than the code 215 (e.g. various HTML of CSS code). In this way, the protected code 227 and/or the metadata 228 may be generated based on values/data contained within the code 215 and/or the webpage 214. For example, integrity verification can be expanded beyond just checking the integrity of the protected code 227 if the correct/expected values/data of (or derived from) the code 215 and/or of the webpage 214 are known when generating the protected code 227 and/or the metadata 228. An example of this is provided later.

The provider system 280 may be a host of a website associated with the webpage 214. The provider system 280 may be an app store from which a webapp 214 or another application 214 may be obtained by the client system 210.

In embodiments that comprise the service system 250, the provider system 280 and the service system 250 may be operated by separate entities, or may be operated by the same entity. The provider system 280 and the service system 250 may be physically separate from each other, or they may share one or more computer systems 100 (e.g. they may be implemented, at least in part, using one or more common servers). Indeed, the provider system 280 may be the same system as, or may be a sub-system/component of, the service system 250.

Additionally, or alternatively, the provider system 280 and the protection system 220 may be operated by separate entities, or may be operated by the same entity. The provider system 280 and the protection system 220 may be physically separate from each other, or they may share one or more computer systems 100 (e.g. they may be implemented, at least in part, using one or more common servers). Indeed, the provider system 280 may be the same system as, or may be a sub-system/component of, the protection system 220.

Additionally, or alternatively, some of the protections applied to the initial code 222 to thereby generate the protected code 227 may be carried out by the protection system 220, with the remainder of the protections applied to the initial code 222 to thereby generate the protected code 227 being carried out by the provider system 280 (i.e. the protection application 223 may be implemented in a distributed form across the protection system 220 and the provider system 280). In particular, in some embodiments, at least some of the protector modules 224 are implemented at the protection system 220 that is separate from the provider system 280, whilst the remaining protector modules 224 are implemented at the provider system 280. Moreover, the database 229 may be part of (or hosted by) the provider system 280 instead of the protection system 220, so that the provider system 280 has the repository of protected code 227 readily available and can supply instances of protected code 227 to the client system 210 as necessary. The metadata generator 226 and/or the library application 221 may be implemented, in whole or in part at the protection system 220 and/or the provider system 280. This means that, for example, the provider system 280 may initially provide some or all of the initial code 222 to the protection system 220; the protection system 220 may then apply one or more protections (via one or more protector modules 224) to the provided initial code 222 to thereby generate intermediate protected code; the protection system 220 may provide that intermediate protected code back to the provider system 280; the provider system 280 may then apply one or more protections (via one or more protector modules 224) to the intermediate protected code to thereby generate final protected code 227 (which may involve, for example, the provider system 280 binding or linking or otherwise combining the intermediate protected code with further code in order to create the protected code 227). It will be appreciated that there may be other ways in which the provider system 280 and the protector system 220 may work together to form the protected code 227 from the initial code 222. For example, for one or more parts $P_i$ of the initial code 222 (i=1, . . . , N), that part $P_i$ may have a respective sequence $P_{i,j}$ (j=1, . . . , n) of protections applied thereto, where protection $Pr_{i,j}$ is applied by a protector module 224 at either the protection system 220 or the provider system 280. Each part $P_i$ may have its own respective sequence $Pr_{i,j}$. The provider system 280 may then use the results of applying the protections $Pr_{i,j}$ (i=1, . . . , N; j=1, . . . , n) to the parts $P_i$ to create the final protected code 227, which may involve combining/link/binding these results with further code that has not been provided to the protection system 220 (which means that the provider system 280 remains in final control over the protected code 227, without having to have provided all of the code initially to the protection system 220).

Additionally, or alternatively, the provider system 280 and the control system 230 may be operated by separate entities, or may be operated by the same entity. The provider system 280 and the control system 230 may be physically separate from each other, or they may share one or more computer systems 100 (e.g. they may be implemented, at least in part, using one or more common servers). Indeed, the provider system 280 may be the same system as, or may be a sub-system/component of, the control system 230.

Whilst FIG. 2a illustrates the database 229 as being part of the protection system 220, this is not necessary in some embodiments. For example, the database 229 may form part of the control system 230 instead, or the database 229 may be separate from the control system 230 and separate from the protection system 220. Therefore, the control system 230 and/or the protection system 220 may be arranged to store (or save or upload) data (e.g. the protected code 227 and metadata 228) in the database 229 and/or read (or access or obtain or download) such data from the database 229 via the network 270 and/or via a different network (such as a secured private network). Thus, the control system 230 may be able to access protected code 227 and its associated metadata 228 from the database 229 independently of the protection system 220—this means that the protection system 220 can work in a "batch mode" to generate multiple instances of the protected code 227 (and their associated metadata 228) and the control system 230 can access and use those instances on an as-needed basis.

The metadata 228 generated by the protection application 223 at the step 404 may, as discussed later, be updated after the metadata 228 has been stored. The initially stored metadata 228 and/or the subsequently updated metadata 228 may comprise, or represent, a variety of different types of information, examples of which are provided later (i.e. the metadata 228 may be viewed as comprising one or more elements, components or separate amounts of data representing different quantities/attributes/parameters/etc.). However, some general categories for (the information making up, or represented by) the metadata 228 are set out below, although it will be appreciated that other ways of categorising the metadata 228 could be used. It will also be appreciated that some or all of the metadata 228 may fall into multiple categories, and that different elements making up the metadata 228 may fall into different categories. In particular:

(a) Some elements of the metadata 228 may be associated with one or more particular instances of the protected code 227—for example, the metadata 228 associated with one instance of the protected code 227 may not work with, or may not be suitable for, another instance of the protected code 227. This may be applicable where, for example, the different instances of the protected code 227 have been generated using different transformations on their data/code. The use of such metadata helps, for example, to ensure that the controller application 232 knows which particular instance of protected code 227 is being executed at the client system 210, or to ensure that only the correct/expected instance of protected code 216 may be executed at a particular client system 210.

(b) The metadata 228 may comprise multiple sets of metadata, each set for use by an instance of the protected code 227. The different sets of metadata may cause the instance of protected code 227 to provide different behaviour or to perform different execution. The use of such metadata helps, for example, to provide dynamic diversity effects—for example, a first set of the metadata could be used to control the instance of protected code 214 at a first point in time, followed by using a second set of the metadata at a second point in time, and so on, which helps make it harder for an attacker to analyse the operation of the protected code 214 at the client system 210, helps protect against replay attacks, etc.

(c) Some elements of the metadata 228 may be used to help synchronise the controller application 232 and the protected code 216, for example to help establish a secret shared between the controller application 232 and the protected code 216.

Figure 5A:
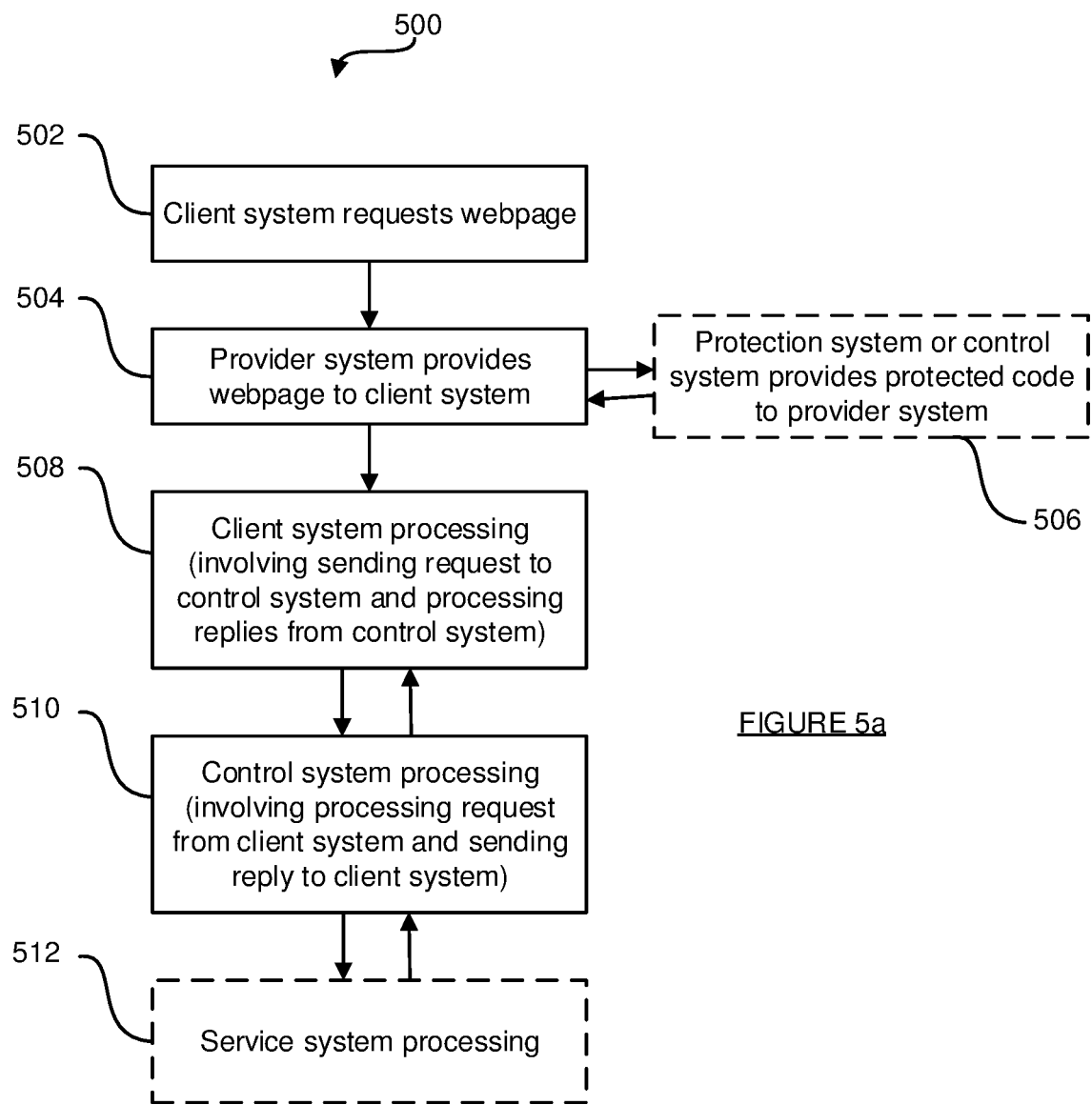
FIGS. 5a and 5b are flowcharts illustrating respective example methods of operating a system according to some embodiments of the invention.

FIG. 5a is a flowchart illustrating an example method 500 of operating the system 200 according to some embodiments of the invention.

At a step 502, the client system 210 issues a request for a webpage 214 to the provider system 280. The request may be communicated via the network 270. Thus, for example, the provider system 280 may comprise one or more servers hosting a website (which may comprise one or more webpages, including the webpage 214). The step 502 could, therefore, involve an operator of the client system 210 using the browser 212 to navigate to the website and thereby request the webpage 214.

Of course, in embodiments that make use of a webapp 214 or an application 214 instead of a webpage 214, the step 502 may involve the client system 210 issuing a request, to the provider system 280, to download (or be provided with or have installed) a webapp 214 or an application 214. The request may be communicated via the network 270. Thus, for example, the provider system 280 may comprise one or more servers configured as an app store. The step 502 could, therefore, involve an operator of the client system 210 using the browser 212 to navigate to a website (e.g. a website of the app store, provided/hosted by the provider system 280) and, by interacting with the website, requesting the download (or provision or installation) of the webapp 214 or application 214 to the client system 210. The following description shall be with reference to webpages 214, but it will be appreciated that this applies analogously and equally to webapps 214 and applications 214.

In response to the request, at a step 504, the provider system 280 provides the webpage 214 to the client system 210. The webpage 214 may be provided/communicated via the network 270.

As mentioned above, the webpage 214 comprises protected code 216. Therefore, in order to be able to provide the client system 210 with the webpage 214 (that comprises the protected code 216), the provider system 280 may request protected code 227 from the protection system 220 so that the provider system 280 can use that protected code 227 as the protected code 216 of the webpage 214. Therefore, as shown in FIG. 5a, at an optional step 506 the provider system 280 may request protected code 227 from the protection system 220 and, in response to that request, the protection system 220 may provide protected code 227 to the provider system 280. Methods by which the protection system 220 may receive requests for protected code 227 and provide protected code 227 in response to such requests have been discussed above with reference to FIG. 4. As discussed above, the protection system 220 may communicate with the control system 230 so that the control system 230 may decide on which instance of the protected code 227 to provide to the provider system 280.

Alternatively, the provider system 280 may request protected code 227 from the control system 230 so that the provider system 280 can use that protected code 227 as the protected code 216 of the webpage 214. Therefore, as shown in FIG. 5a, at the optional step 506 the provider system 280 may request protected code 227 from the control system 230 and, in response to that request, the control system 230 may provide protected code 227 to the provider system 280. Methods by which the control system 220 may interact with the protection system 220 to obtain protected code 227 have been discussed above with reference to FIG. 4. As discussed above, the control system 230 may decide on which instance of the protected code 227 to provide to the provider system 280.

Alternatively, the provider system 280 may have previously been supplied by the protection system 220 with one or more instances of protected code 227, so the provider system 280 may already be storing (or may have access to or may have obtained) one or more instances of protected code 227. Similarly, in some embodiments, the provider system 280 may be able to directly access the database 229. Thus, the provider system 280 may use one of these instances of protected code 227 to which the provider system 280 has access as the protected code 216 of the webpage 214. As discussed above, the provider system 280 may communicate with the control system 230 so that the control system 230 may decide on which instance of the protected code 227 the provider system 280 should provide.

The provider system 214 may, therefore, store a template for the webpage 214 (comprising for example, HTML code and/or CCS code and/or code 215 other than the protected code 216) and, at the step 504, form (the specific version of) the webpage 214 that is to be provided (or sent or communicated) to the client system 210 by including or incorporating the protected code 227 into the template as the protected code 216 for the webpage 214.

In embodiments in which the protected code 227 is a particular (unique) protected instance of the initial code 222, then the metadata 228 associated with that particular instance of protected code 227 may be updated to store or comprise information in relation to the provision of this instance of protected code 227, such as one or more of: date and/or time of provision of the protected code 227; details (such as name or other identifier, IP address, etc.) of the provider system 280 which requested the instance of protected code 227; details (such as name or other identifier, IP address, identity of a user, etc.) of the client system 210 to which the instance of protected code 227 is to be provided; an identification of the particular instance of protected code 227 (e.g. an ID or version number); etc. Thus, the provider system 280 may update the metadata 228 directly in the database 229 itself (if it has access to the database 229), or may supply this information to the protection system 220 (for example, when requesting the protected code 227), so that the protection system 220 can store this information as part of the metadata 228 in the database 229.

At a step 508, the client system 210 (or the browser 212 of the client system 210) processes or executes the webpage 214. As mentioned above with reference to FIG. 3, this involves the client system 210 forming and sending one or more requests to the control system 230 and then processing corresponding replies received by the client system 210 from the control system 230. Examples of this have been discussed above with reference to FIG. 3.

At a step 510, the control system 230 processes requests received from the client system 210 (namely the requests sent due to the processing or execution of the webpage 214) and sends the client system 210 corresponding replies. Examples of this have been discussed above with reference to FIG. 3.

The processing, by the control system 230, of a request received from the client system 210 may comprise the control system 230 interacting with the service system 250, as illustrated by an optional step 512 in FIG. 5. This is described in more detail below with respect to FIG. 6a.

Figure 5B:
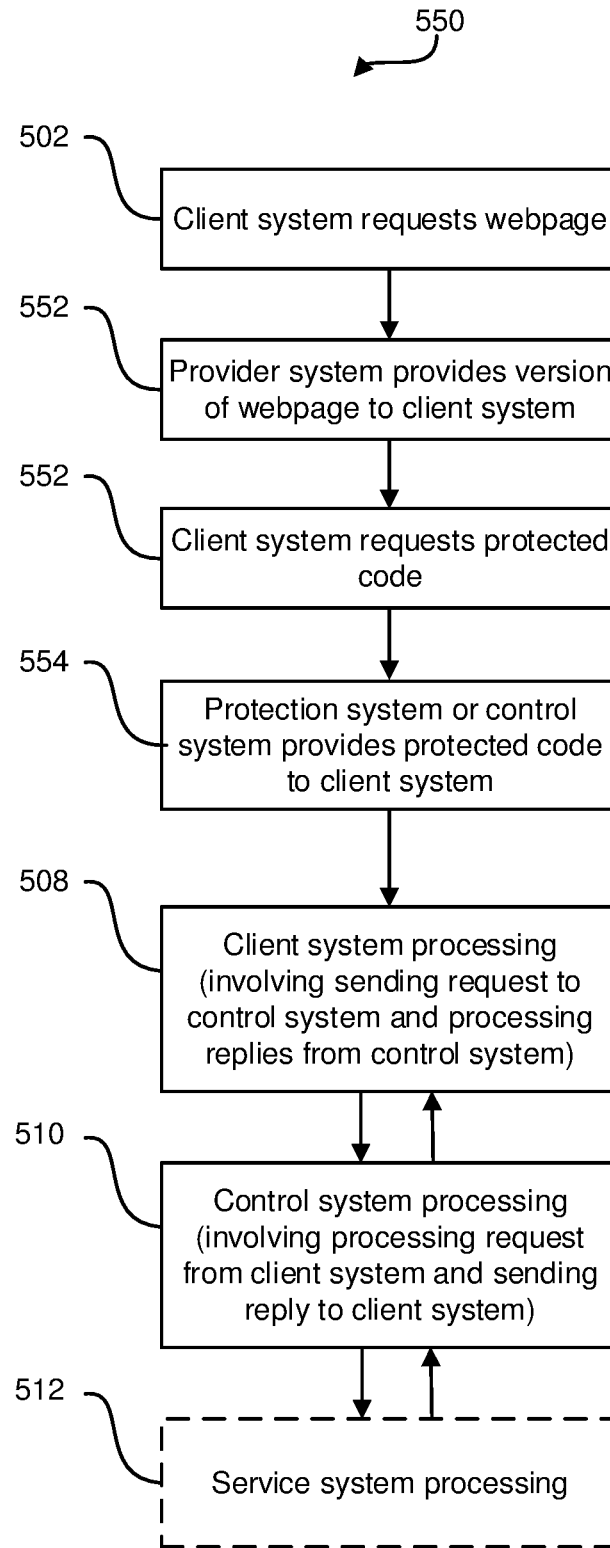

FIG. 5b is a flowchart illustrating another example method 550 of operating the system 200 according to some embodiments of the invention. Steps that the method 550 of FIG. 5*b* has in common with the method 500 of FIG. 5*a* share the same reference numeral and shall, therefore, not be described again in detail below.

At a step 502, the client system 210 issues a request for a webpage 214 (or a webapp 214 or an application 214) to the provider system 280.

In response to the request, at a step 552, the provider system 280 provides a version of the webpage 214 (or a version of the webapp 214 or a version of the application 214) to the client system 210. The version provided does not comprise the protected code 216 but may, instead, contain a link, an address (e.g. a URL), or information that enables the client system 210 to request or obtain/access the protected code 216 from the protection system 220 and/or from the control system 230.

After receiving the version of the webpage 214, the client system 210 may, at a step 554, use the above-mentioned link, address or other information to send a request, to the protection system 220 and/or the control system 230, for protected code 216. The request may be communicated via the network 270.

In response to that request, at a step 556 the protection system 220 may provide protected code 227 to the client system 210. Methods by which the protection system 220 may receive requests for protected code 227 and provide protected code 227 in response to such requests have been discussed above with reference to FIG. 4. As discussed above, the protection system 220 may communicate with the control system 230 so that the control system 230 may decide on which instance of the protected code 227 to provide to the provider system 280. Alternatively, the control system 230 may provide protected code 227 to the client system 210. The control system 230 may obtain the protected code 227 from the database 229 (if the control system 230 has direct access to the database 229); alternatively, the control system 230 may request the protected code 227 from the protection system 220. As discussed above, the control system 230 may decide on which instance of the protected code 227 to provide to the provider system 280. The protected code 227 may be communicated to the client system 210 via the network 270.

In embodiments in which the protected code 227 is a particular (unique) protected instance of the initial code 222, then the metadata 228 associated with that particular instance of protected code 227 may be updated by the protection system 220 and/or by the control system 230 to store or comprise information in relation to the provision of this instance of protected code 227, such as one or more of: date and/or time of provision of the protected code 227; details (such as name or other identifier, IP address, identity of a user, etc.) of the client system 210 to which the instance of protected code 227 is to be provided; etc. In some embodiments, the control system 230 and the client system 210 may use a session cookie so that the control system 230 can identify which particular instance of protected code 227 the client system 210 is currently executing.

Processing for the method 550 may then continue with the steps 508 and 510 (and optionally the step 512) as set described above for FIG. 5*a*.

Figure 6A:
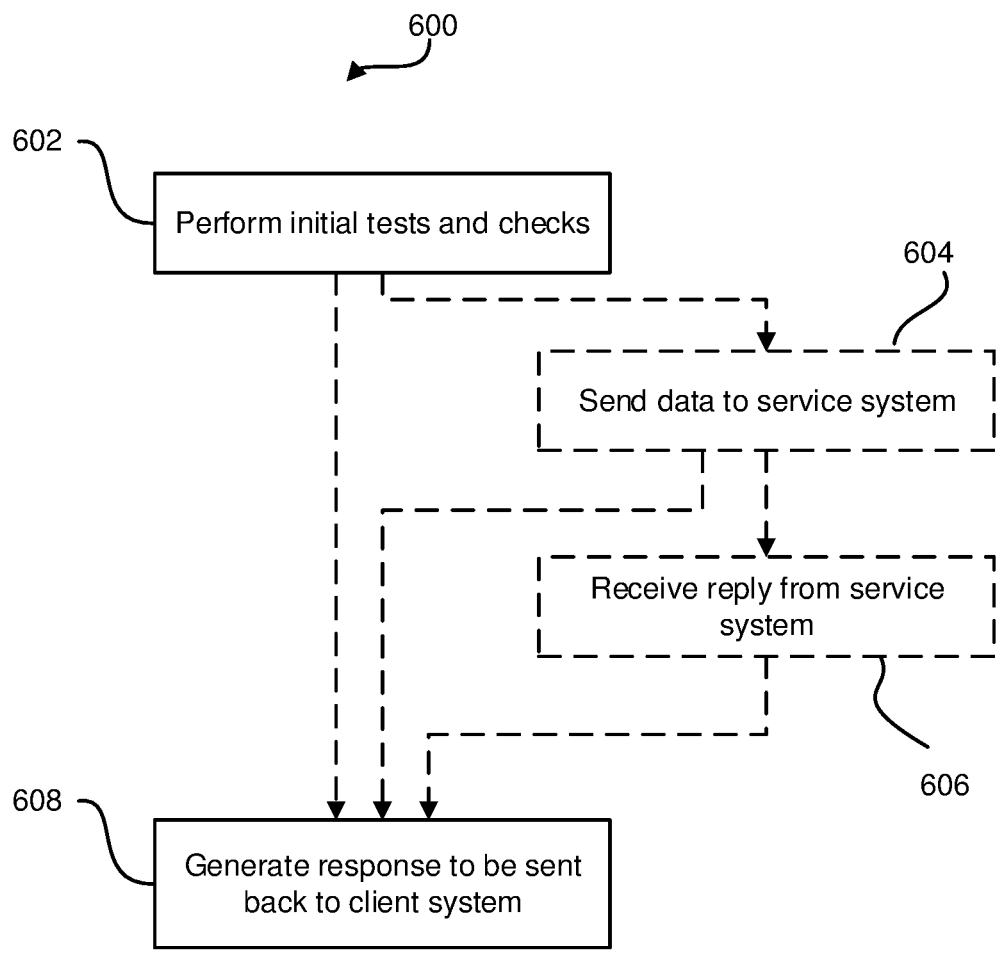
FIG. 6a is a flowchart illustrating an example method that may be carried out by a controller application as part of the method of FIG. 3 according to some embodiments of the invention.

FIG. 6*a* is a flowchart illustrating an example method 600 that may be carried out by the controller application 232 as part of the step 308 of FIG. 3 according to some embodiments of the invention. The method 600 may involve the control system 230 interacting with the service system 250.

As discussed above, at the step 302 the client system 210 generates a request that includes information that enables the control system 230 to carry out verification and/or authentication and/or other functionality. In addition to this information, the request generated by the client system 210 may comprise:

(a) data identifying information that the client system 210 wishes to obtain (or request) from the service system 250 (e.g. from a website associated with the webpage 214) and/or (b) data that the client system 210 wishes to provide to the service system 250 (e.g. to enable the service system 250 to perform subsequent processing based on that data).

As discussed above, the step 308 may comprise the control system 230 determining or obtaining an identification of (the particular instance of) the protected code 216 and/or performing one or more tests or checks. This is illustrated in FIG. 6*a* as a step 602, and will be described in more detail with reference to FIG. 6*b* shortly.

At the step 602, the control system 230 may determine that a response can, or should, be generated and sent back to the client system 210 without the control system 230 having to communicate with the service system 250. For example:

The verification or authentication of the protected code 216 and/or of the code 215 and/or of the website 214 may fail—for example, the results of the verification or authentication may indicate that the client system 210 is not sufficiently trustworthy/secure and/or that an attacker may be carrying out an attack. Therefore, the control system 230 may be configured so that, if this failure occurs, the response to be sent back to the client system 210 is to prevent the client system 210 from accessing content of, or performing the "normal" functionality provided by, the code 215 and/or the webpage 214. Such a response may, for example, include a flag (or other data) which the protected code 216 is arranged to detect (at the step 312)—the protected code 216 may be configured so that if it detects this flag, then the protected code 216 ceases to provide the "normal" functionality; alternatively, the response may, for example, comprise data that the protected code 216 and/or the code 215 and/or the webpage 214 is to process, where this data results in error/exception functionality of the protected code 216 and/or the code 215 and/or the webpage 214 being invoked or termination of the protected code 216 and/or the code 215 and/or the webpage 214 (e.g. the data may be random data as opposed to data formatted according to an expected format). In any of these situations, the control system 230 does not need to communicate with the service system 250.

Similarly, the processing at the step 602 may determine that the settings/configuration of the browser 212 or of the client system 210 do not meet target security criteria and or desired settings/configuration. This may be taken as an indication that the client system 210 is not sufficiently trustworthy/secure and/or that an attacker may be carrying out an attack. Therefore, the control system 230 may be configured so that, in this situation, the response to be sent back to the client system 210 is to cause an adjustment at the client system 210 of these settings/configurations so as to meet the target security criteria or desired settings/configuration. In this situation, the control system 230 does not need to communicate with the service system 250.

The verification or authentication of the protected code 216 and/or of the code 215 and/or of the website 214 may be successful—for example, the results of the verification or authentication may indicate that the client system 210 is sufficiently trustworthy/secure and/or that no attacks have been detected. The control system 230 may be configured so that, in this situation, the response to be sent back to the client system 210 is to acknowledge receipt of the request from the client system 210. In this situation, the control system 230 may not need to communicate with the service system 250.

It will be appreciated that there may be other scenarios in which the response to be sent back to the client system 210 can be generated without the control system 230 having to communicate with the service system 250.

In the above situations in which, due to the nature of the request from the client system 210, the response to be sent back to the client system 210 can, or should, be generated without the control system 230 having to communicate with the service system 250, then the control system 230 may still send information to the service system 250, for example to report the fact that the control system 230 has received such a request from the client system 210.

The controller application 232 may then generate the response that is to be sent back to the client system 210 accordingly at a step 608.

However, the result of the processing at the step 602 may be that the control system 230 determines that a response can only be generated and sent back to the client system 210 if the control system 230 interacts with (or communicates with) the service system 250. In this situation, the method 600 comprises the step 604 and, optionally, the step 606. At the step 604, the control system 230 may pass or communicate the data of (or relating to) the request that was received from the client system 210 at the step 306 (or at least some of the information contained in that request, such as the data (a) and/or (b) mentioned above) to the service system 250 via the network 270. The controller application 232 may then generate the response that is to be sent back to the client system 210 accordingly. In some embodiments, the service system 250 processes the received data (e.g. at the step 512 of FIGS. 5*a* and 5*b*) and provides a corresponding reply (based on that processing) back to the control system 230. Therefore, at the step 606, the control system 230 may receive a reply from the service system 250. In this case, the controller application 232 may then generate the response that is to be sent back to the client system 210 based on the reply from the service system 250.

For example:

The verification or authentication of the protected code 216 and/or of the code 215 and/or of the website 214 may be successful—for example, the results of the verification or authentication may indicate that the client system 210 is sufficiently trustworthy/secure and/or that no attacks have been detected. The request received from the client 210 may be, or may comprise, a request for information or data from the service system 250. Therefore, at the step 604, the controller application forwards this request for information to the service system 250 and, at the step 606, the controller application 232 may receive the requested information (or another response, such as a response indicating that the requested information is not available) as a reply from the service system 250. The controller application 232 may, therefore, at the step 608, form the response to be sent back to the client system 210, with this response comprising, or being based on, the reply from the service system 250 (e.g. the response may comprise requested information).

The verification or authentication of the protected code 216 and/or of the code 215 and/or of the website 214 may be successful—for example, the results of the verification or authentication may indicate that the client system 210 is sufficiently trustworthy/secure and/or that no attacks have been detected. The request received from the client 210 may be, or may comprise, information or data that needs to be sent to the service system 250 (but for which no reply from the service system 250 based its on processing of the information is expected). Therefore, at the step 604, the controller application forwards this information to the service system 250 and, at the step 608, forms the response back to the client system 210 indicating that the information has been sent to the service system 250.

The verification or authentication of the protected code 216 and/or of the code 215 and/or of the website 214 may fail—for example, the results of the verification or authentication may indicate that the client system 210 is not sufficiently trustworthy/secure and/or that an attacker may be carrying out an attack. In some embodiments, the controller application 604 provides data to the service system 250 to indicate the nature of this failure. The service system 250 may then perform certain processing in response to the failure (e.g. locking an account of a customer associated with the client system 210) and provide back to the service system 250 an indication of the action or processing that it has taken and/or of any action that the service system 250 wishes the client system 210 to undertake. Therefore, at the step 606, the controller application 232 may receive this indication as a reply from the service system 250. The controller application 232 may, therefore, at the step 608, form the response back to the client system 210 (such as a response that comprises this indication).

It will be appreciated that there may be other scenarios in which the response to be sent back to the client system 210 can be generated, with there having first been communication or interaction between the control system 230 and the service system 250.

In this way, the control system 230 may, effectively, act as a proxy between the client system 210 and the service system 250. The client system 210 may believe it is communicating directly with the service system 250, but the communications may be redirected to the control system 230. Thus, the control system 230 effectively provides dynamic protection/security checking and enforcement between the client system 210 and the service system 250. If the client system 210 has adequate security and configurations and no attacks are launched (or at least not detected), then the client system 210 and the service system 250 may interact with each other (so that the client system 210 can access the services provided by the service system 250) seamlessly. However, if the client system 210 does not have adequate security and configurations and/or attacks are launched (or at least are detected), then the control system 230 may take measures (as set out above) to address these security/configuration/attack problems.

Due to the nature of the secured communications between the client system 210 and the control system 230—for both the requests sent by the client system 210 and the responses sent by the control system 230—(as provided by the protected code 216 and the controller application 232), there is no need for the client system 210 to make use of (or at least rely on) the usual cookies or other types of API key that would otherwise normally be used to establish a secured session between the client system 210 and the control system 230. This is because the communications between the client system 210 and the control system 230 (as provided by the protected code 216 and the controller application 232) are secured, and the control system 230 is able to confirm both the identity of the client system 210 and the authenticity/integrity of the webpage 214 (or the code 215 or the protected code 216) at the client system 210. Instead, such cookies or other types of API key may be used for the communications between the control system 230 and the service system 250, but these systems are outside of the control of an attacker (who only has access to the client system 210). Hence, security is improved.

The controller application 232 may be arranged to extract data from a request received (at the step 306) from the client system 210 and store that data (either as the data itself or as a tokenised version of the data) as data 262 within the repository 260. The controller application 232, as part of the interaction with the service system 250 (e.g. the steps 510 and 512 of FIGS. 5a and 5b, or the step 604 of FIG. 6a) may, instead of providing the service system 250 with the actual data received as part of the request from the client system 210, provide the service system 250 with an indication of where and/or how the service system 250 may obtain or access the corresponding data 262 from the repository 260. The use of the repository 260 in this way may help increase security. Additionally, the controller application 232 may store data (or tokenised data) in the repository 262 in an encrypted or transformed manner—the service system 250 may then be arranged to operate on, use otherwise use/ access, the encrypted or transformed data, potentially without having to decrypt the encrypted data, or undo the transformations, first. The controller application 232 and the service system 250 may share one or more cryptographic keys, or other cryptographic information, to enable this to happen. Again, this helps improve the overall security.

If, at the step 602, the controller application 232 identifies that one or more of the checks/tests have not been passed (e.g. verification or authentication of the protected code 216 and/or the code 215 and/or the webpage 214 has failed), then the controller application 232 may be arranged to change the provisioning of instances of protected code 216 to that particular client system 210, for example by performing one or more of: (a) increasing the frequency at which the client system 210 receives different instances of the protected code 216 (e.g. decreasing the above-mentioned parameter W), to thereby make it difficult for the user of the client system 210 to try to learn behaviour of the protected code 216 and launch a successful attack; (b) ensure that the same instance of protected code 216 is always provided to that client system 210 (i.e. effectively setting the above-mentioned parameter W to be infinity), to thereby limit the impact of any attack to just that one particular instance; (c) ensuring that subsequent instances of protected code 216 provided to that client system 210 have additional functionality to enable the protected code 216 to gather further information regarding the client system 210 and/or activity by the user of the client system 210 to thereby gather evidence related to possible attacks; (d) prevent any further provisioning of instances of protected code 216 to that client system 216.

Figure 6B:
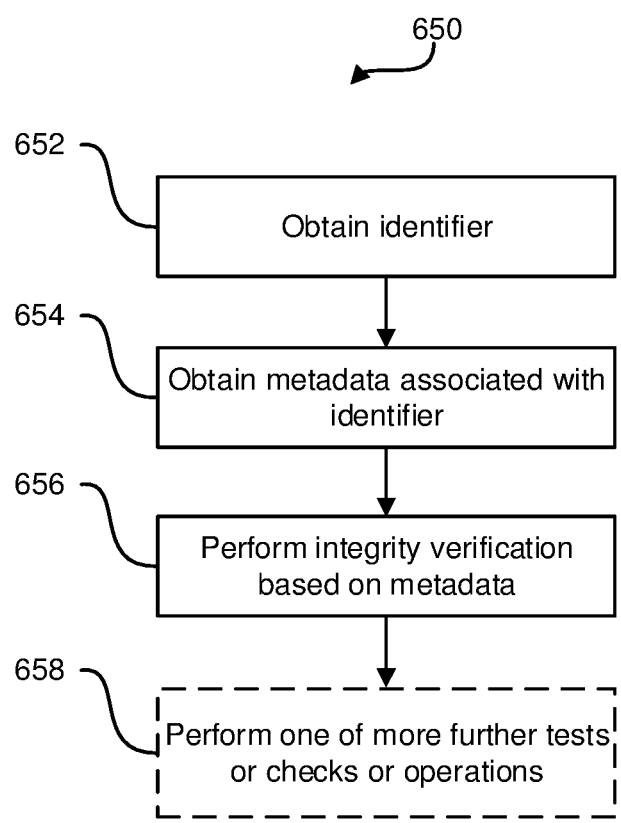
FIG. 6b is a flowchart illustrating example processing that may be carried out in some embodiments at part of the method of FIG. 3 according to some embodiments of the invention.

FIG. 6b is a flowchart illustrating example processing 650 that may be carried out in some embodiments at the step 308 of FIG. 3 (or at the step 602 of FIG. 6a) according to some embodiments of the invention.

At a step 652, the controller application 232 obtains (or derives) an identifier of the protected code 216 (or of the code 215 or the webpage 214), based on data provided by the protected code 216 in the request received by the controller application 232 at the step 306.

At a step 654, the controller application 232 may use this identifier to obtain metadata 228 associated with the (particular instance) of the protected code 216. For example, the database 229 may be indexed according to identifier, so that controller application 232 can use the identifier obtained at the step 652 to index the database 229 and access the associated metadata 228.

At a step 656, the controller application 232 may use at least some of the metadata 228 accessed at the step 654 along with data provided by the protected code 216 in the request received by the controller application 232 at the step 306 in order to perform integrity verification. For example, at least part of the data provided by the protected code 216 in the request received by the controller application 232 at the step 306 may comprise one or more values (e.g. the above-mentioned modification data) derived from (or based on) the current protected code 216 (or the current code 215 or the current webpage 214) at the client system 210, and the metadata 228 obtained at the step 654 may comprise one or more expected integrity values—the controller application 232 may, therefore compare the one or more values received in the request with the one or more expected integrity values—if the one or more values received in the request match (or equal) the one or more expected integrity values, then the controller application 232 may determine that the protected code 216 (or the code 215 or the webpage 214) has not been tampered with; otherwise, the controller application 232 may determine that an attack is being (or has been) performed and that the protected code 216 (or the code 215 or the webpage 214) has been tampered with. It will be appreciated that the controller application 232 may perform other processing using the one or more values received in the request and the expected integrity values to in order to carry out integrity verification.

Thus, the outcome of the steps 652, 654 and 656 may be either (a) the controller application 232 knows (with confidence) exactly which (instance of) protected code 216 it is in communication with and that the (instance of) protected code 216 (or the code 215 or the webpage 214) has not been tampered with or modified or (b) the controller application 232 may not be able to ascertain (with confidence) exactly which (instance of) protected code 216 it is in communication with or (c) the controller application 232 knows (with confidence) exactly which (instance of) protected code 216 it is in communication with and that the (instance of) protected code 216 (or the code 215 or the webpage 214) has been tampered with or modified. If (b) or (c) occurs, then the controller application 232 may take appropriate measures (such as preventing the webpage 214 from performing its normal/expected functionality, etc. as has been discussed above); if (a) occurs, then the controller application 232 may determine that the webpage 214 is executing legitimately in a sufficiently secure manner (subject to the outcome of any further processing at a step 658). Since the protected code 216 is implemented in a protected way designed to resist white-box attacks, the controller application 232 can have confidence in the outcomes of the steps 652 and 656 and, moreover, can have confidence that any measures that the controller application 232 wishes the protected code 216 to implement in order to enforce the security policy will actually be conducted.

At a step 658, the controller application 232 may carry out one or more further tests or checks or other functionality (such as checking whether the protected code 216 is executing in a debug environment at the client system 210), as has been discussed above.

3—Example Deployment Scenarios

Set out below are some example deployment scenarios for the system 200. It will, of course, be appreciated that many other deployment scenarios for, and applications of, the system 200 are possible and that the examples given below are merely for the purpose of illustration.

3.1—Financial Transaction System 1

The service system 250 may be the same entity as, or a sub-system of, the provider system 280. The provider system 280 may host a website for a bank (or some other financial institution). The webpage 214 that the client system 210 obtains from the provider system 280 may, therefore, be a webpage 214 that enables the operator of the client system 210 to interact with a bank account (or other financial accounts or instruments). Alternatively, the client system 210 may be running an application 214 (or a webapp 214) that the bank has made available to its customers.

The client system 210 may, therefore, be arranged to interact with the service system 250 of the bank via the control system 230. The protected code 216 may, therefore, be arranged to work with the controller application 232 (as discussed above with reference to FIG. 3) so as to perform one or more of: (1) checking that the protected code 216 and/or the code 215 and/or the webpage 214 has not been modified and, if such modification is detected, preventing the client system 210 interacting with the service system 250 and/or informing the service system 250 of a possible breach of security; (2) checking, and enforcing, that the protected code 216 and/or the code 215 is not being executed within a debugger at the client system 210; etc.

3.2—Financial Transaction System 2

The service system 250 may be different from the provider system 280. The provider system 280 may host a website for an online merchant (i.e. a retailer). The service system 250 may provide payment/financial services, to enable the merchant's customers to make payment to the merchant for goods or services provided by the merchant or otherwise interact financially with for the merchant.

The webpage 214 that the client system 210 obtains from the provider system 280 may, therefore, be a webpage 214 that enables the operator of the client system 210 to enter credit card details (or other payment information) in order to make a payment to purchase goods or services from the merchant.

The protected code 216 may, therefore, be arranged to work with the controller application 232 (as discussed above with reference to FIG. 3) so as to perform one or more of: (1) checking that the protected code 216 and/or the code 215 and/or the webpage 214 has not been modified and, if such modification is detected, preventing the client system 210 interacting with the service system 250 and/or informing the service system 250 (and/or the provider system 280) of a possible breach of security; (2) checking, and enforcing, that the protected code 216 and/or the code 215 is not being executed within a debugger at the client system 210; (3) checking that validation of data fields (such as a card verification value (or CVV number) or an expiry date) by the webpage 214 has not been disabled and, if it has been disabled, re-enabling it; etc.

3.3—Content Player Systems

In this example, the service system 250 may be the same entity as, or a sub-system of, the provider system 280, or may be different from the provider system 280. The service system 250 may take the form of a content distribution network (CDN) (or at least one or more servers of a CDN). CDN's are well-known and shall, therefore, not be described in more detail herein. The content may comprise, for example, one or more of audio content, video content, and image content. The provider system 280 may host a website for accessing digital content from the CDN, so that the webpage 214 that the client system 210 obtains from the provider system 280 may comprise protected code 216 that implements at least part of a content/media player. Alternatively, the client system 210 may be operating a content/media player application 214 (or a webapp 214) that the provider system 280 has made available.

The protected code 216 may, therefore, be arranged to work with the controller application 232 (as discussed above with reference to FIG. 3) so as to perform one or more of: (1) checking that the protected code 216 and/or the code 215 and/or the webpage 214 has not been modified and, if such modification is detected, preventing the webpage 214 from playing further content; (2) checking, and enforcing, that the protected code 216 and/or the code 215 is not being executed within a debugger at the client system 210; etc.

Figure 7B:
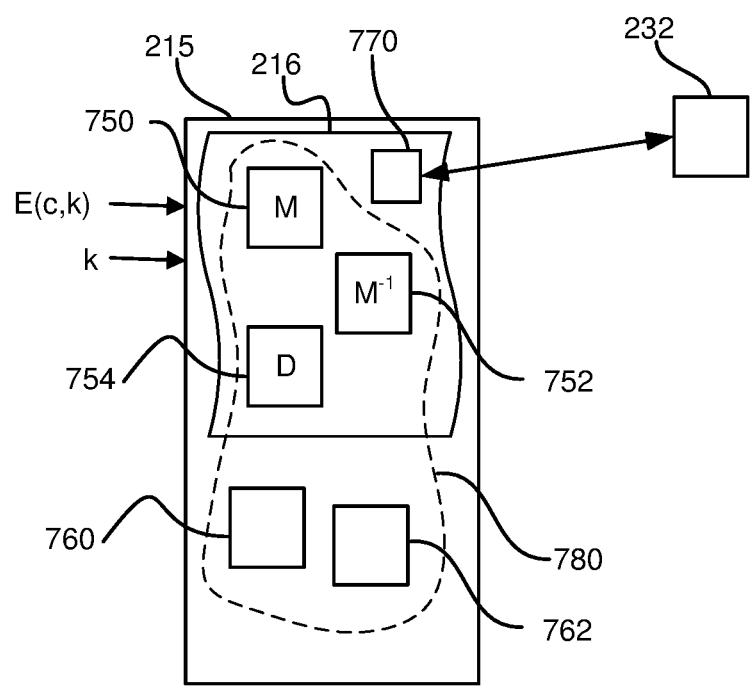
FIG. 7b schematically illustrates some of the modules that may be implemented (in a secured manner) as part of the protected code so as to achieve this integrity/modification checking and enforcement according to some embodiments of the invention.

FIG. 7a is a flowchart illustrating a method 700 in which the protected code 216 may work, according to some embodiments of the invention, with the controller application 232 (in the manner set out in the method 300 of FIG. 3) so as to, for example, implement the above-mentioned integrity/modification checking and enforcement. FIG. 7b schematically illustrates some of the modules that may be implemented (in a secured manner as discussed above) as part of the protected code 216 so as to achieve this integrity/modification checking and enforcement according to some embodiments of the invention.

At a step 702, the protected code 216 receives encrypted content E(c,k), where c is the content and k is a key for decrypting the content. (Herein, the term E(x,y) shall be used to represent an encrypted form of data x that is decryptable using decryption key k).

At a step 704, a modification module 750 of the protected code 216 applies an invertible modification function M to the encrypted content E(c,k). The modification function M is seeded, or keyed or otherwise dependent, on data d. Thus, the modification function M may itself be an encryption operation, but it will be appreciated that simpler operations, such as XORing the encrypted content E(c,k) with the data d (or values based on the data d), could be used instead. Thus, the output of the step 704 is modified encrypted content M(E(c,k),d).

The data d may have previously been provided to the protected code 216 from the controller application 232 (i.e. the data d may be a dynamic value/data). Alternatively, the data d may be a static value. Alternatively, the data d may be a value that the protected code 216 is arranged to generate (e.g. as a random number/data) and provide to the controller application 232 (for example, as part of a request at a step 706). The protected code 216 is arranged to store (either within the protected code 216 itself or as a temporary variable in memory at the client system 210) the data d, albeit in a secured manner using one or more of the software protection technique discussed above.

At the step 706, the protected code 216 sends a request to the controller application 232, where the request comprises data that enables the controller application 232 to perform its integrity processing and/or authenticity processing and/or other checking/tests. This corresponds to the steps 302 and 304 of FIG. 3.

At a step 708, the controller application 232 performs its integrity processing and/or authenticity processing and/or other checking/tests.

At a step 710, the controller application 232 determines, based on the results of the processing at the step 708, whether or not the client system 210 is permitted to view/access the content c. If the controller application 232 determines that the client system 210 is permitted to view/access the content c, then, at a step 712, the controller application 232 generates a response comprising the data d. If, on the other hand, the controller application 232 determines that the client system 210 is not permitted to view/access the content c, then, at a step 714, the controller application 232 generates a response comprising data g, where the data g is not equal to the data d. The data g may, for example, be randomly generated by the controller application 232.

The response may, additionally, contain a next/new value for the data value d to be used by the protected code 216 the next time that the step 704 is performed. This new value for d may, for example, be randomly generated by the controller application 232.

At a step 716, the controller application 232 sends the response (containing the data d or the data g) to the client system 210.

The steps 708-716 together therefore correspond to the steps 306-310 together of FIG. 3.

At a step 718, an inverse-modification module 752 of the protected code 216 applies the inverse $M^{-1}$ of the modification function M to the modified encrypted content M(E(c,k),d) that was generated at the step 704. The inverse $M^{-1}$ is seeded, or keyed or otherwise dependent, on the data (be that the data d or the data g) received as part of the response from the controller application 232. Thus: (a) if the controller application 232 had determined that the client system 210 is permitted to view/access the content c, then the output of the step 718 is $M^{-1}$(M(E(c,k),d),d)=E(c,k), i.e. the original encrypted content; whereas (b) if the controller application 232 had determined that the client system 210 is not permitted to view/access the content c, then the output of the step 718 is $M^{-1}$(M(E(c,k),d),g)≠E(c,k), i.e. not the original encrypted content.

At a step 720, a decryption module 754 of the protected code 216 performs a decryption operation D (corresponding to the encryption operation E) on the output of the step 718 using the key k. Therefore: (a) if the controller application 232 had determined that the client system 210 is permitted to view/access the content c, then the output of the step 720 is D(E(c,k),k)=c, i.e. the original unencrypted content c; whereas (b) if the controller application 232 had determined that the client system 210 is not permitted to view/access the content c, then the output of the step 720 is D($M^{-1}$(M(E(c,k),d),g),k)≠c, i.e. not the original unencrypted content c.

In the above, the provision of the decryption key k to the protected code 216 may be via any standard conditional access or digital rights management process for providing a decryption key to a media player.

Whilst it would be possible to move the decryption operation D at the step 720 to be carried out between the steps 702 and 704 (so that the modification M applied at the step 704 is carried out on the decrypted content c), it will be appreciated that carrying out the modification M and the inverse modification $M^{-1}$ prior to the decryption operation D helps ensure that, when the controller application 232 determines that the client system 210 is not permitted to view/access the content c, the use of the "incorrect" data g instead of the data d for the inverse modification $M^{-1}$ at the step 718 means that the output of the decryption operation D will, effectively, appear to be random data (and therefore unusable by the client system 210 or its operator).

FIG. 7b illustrates additional modules that may for part of the code 215 and/or the protected code 216. For example, the protected code 216 may comprise one or more modules 770 for interacting with the controller application 232 to enable the controller application 232 to perform its integrity processing and/or authenticity processing and/or other checking/tests (e.g. carry out the steps 302 and 304 of FIG. 3). The code 215 and/or the protected code 216 may comprise one or more further modules so as to provide a media player (illustrated conceptually by the dashed line 780). For example, the code 215 may comprise a data decompression module 760 to perform any data decompression required (on the output of the decryption module 754) and a rendering module 762 to provide a visual and/or audio output (using the output of the data decompression module 760 and/or the output of the decryption module 754).

Figure 8:
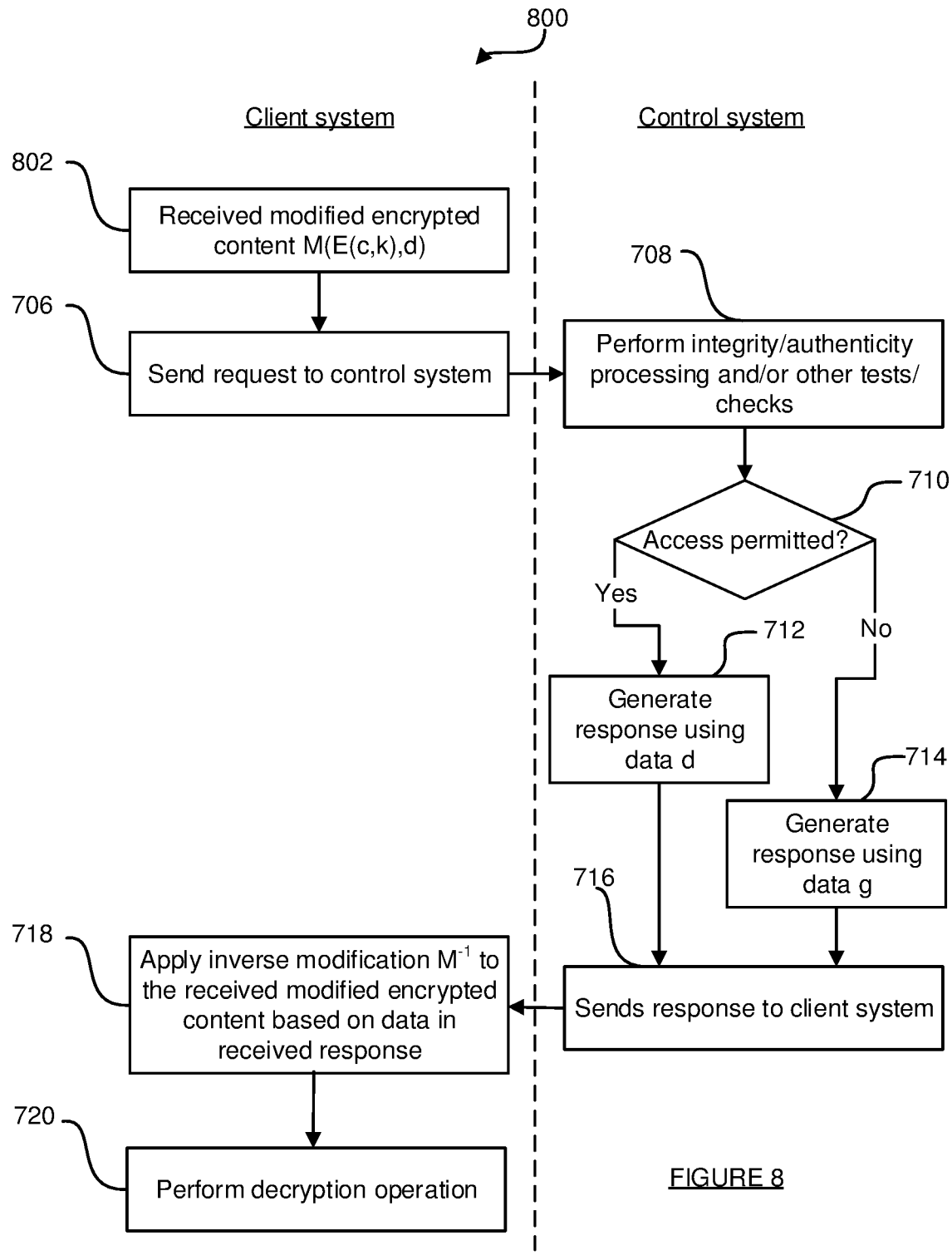
FIG. 8 is a flowchart illustrating another method, according to some embodiments of the invention, in which protected code may work with a controller application 232 (in the manner set out in the method of FIG. 3) so as to implement integrity/modification checking and enforcement.

FIG. 8 is a flowchart illustrating another method 800, according to some embodiments of the invention, in which the protected code 216 may work with the controller application 232 (in the manner set out in the method 300 of FIG. 3) so as to, for example, implement the above-mentioned integrity/modification checking and enforcement. The method 800 is the same as the method 700, except that the steps 702 and 704 of the method 700 have been replaced by a step 802. At the step 802, the protected code 216 receives already modified encrypted content M(E(c,k),d). Thus, the protected code 216 does not need to implement the modification function M (i.e. it does not need the modification module 750).

Thus, the client system 210 receives modified content M(E(c,k),d). The modification M may be applied to the encrypted content E(c,k) by the control system 230, with the control system 230 then providing the modified content M(E(c,k),d) to the client system 210. In this way, the control system 230 may be viewed as part of the CDN. Alternatively, the control system 230 may be arranged to provide the data d to, say, the service system 250 so that the service system 250 may apply the modification M, using the data d, to the encrypted content E(c,k), with the service system 250 then providing the modified content M(E(c,k),d) to the client system 210.

Figure 7C:
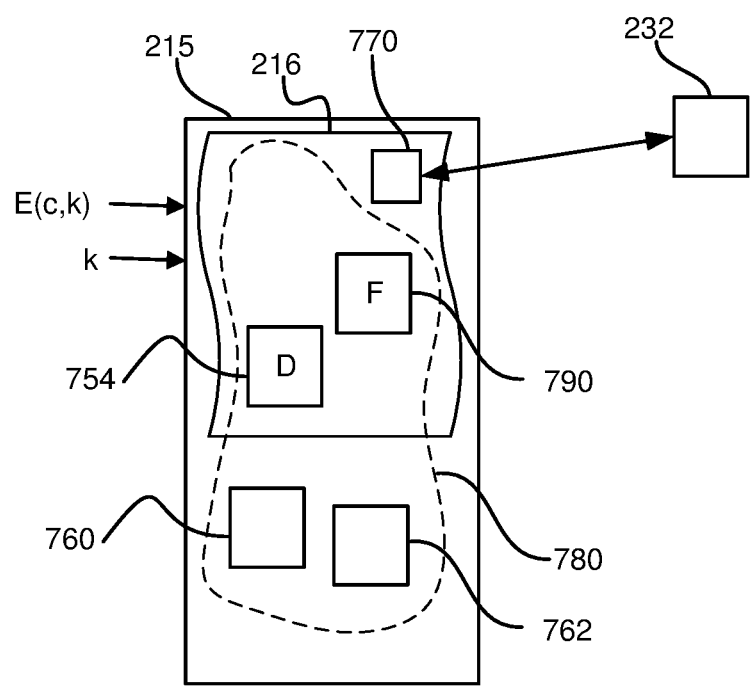
FIGS. 7c and 7d schematically illustrate implementations of protected content players according to some embodiments of the invention.

FIG. 7c illustrates an alternative embodiment for implementing a content player. The protected code 216 may be arranged to implement the above-mentioned decryption module 754, a watermark module 790 and the above-mentioned additional modules 770. The additional module(s) 770 interact with the controller application 232 to enable the controller application 232 to perform its integrity processing and/or authenticity processing and/or other checking/tests (e.g. carry out the steps 302 and 304 of FIG. 3). If the response received back from the controller application 232 is to enable the client system 210 to access the content c, then the processing performed by the protected code (at the step 314) may comprise: (a) the decryption module 754 decrypting the received encrypted content E(c, k) and (b) a watermark module 790 applying a watermark to the decrypted content. Watermarking is well-known, as has been described above. The watermarked content may then be passed to the data decompression module 760 for it to perform any data decompression required (on the output of the watermark module 790), with the rendering module 762 then providing a visual and/or audio output (using the output of the data decompression module 760 and/or the output of the watermark module 790). It is possible that the watermark module 790 may need to operate on decompressed content, in which case the data decompression module 760 may form part of the protected code 216—the decrypted content output from the decryption module 754 would then be passed to the data decompression module 760 for decompression, and the decompressed content output by the data decompression module 760 would then be watermarked by the watermark module 790.

Figure 7D:
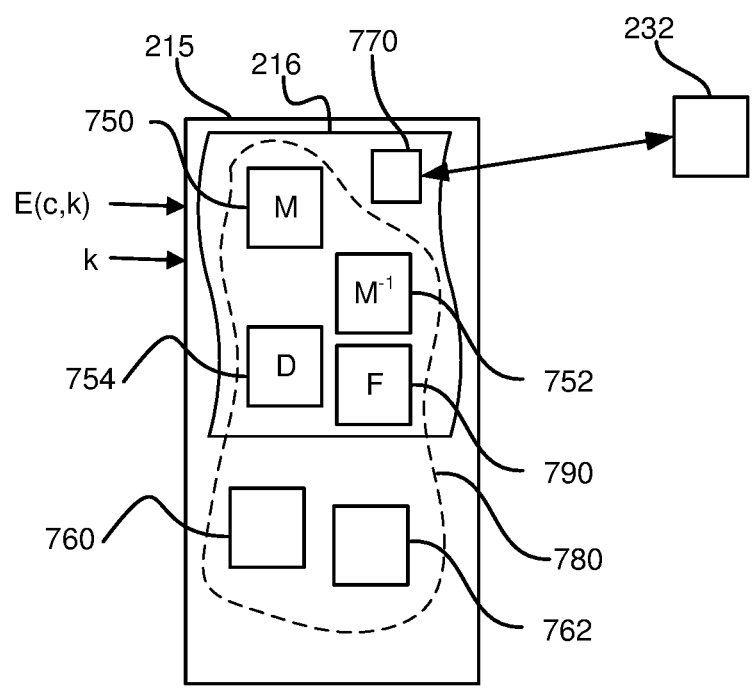

The embodiments of FIGS. 7b and 7c could, of course, be combined, as illustrated in FIG. 7d.

3.4—Home Network or LAN

At least some of the system 200 may form part of, or be implemented as (or using), a home network or a local area network. For example, a home or an enterprise may comprise one or more client devices 210 and the control system 230, which are in communication with each other via a local area network (part of the network 270) or which form part of a home network (involving at least part of the network 270). The controller application 232 may, therefore, be a secured/protected application executing on the control system 230. The service system 250 and/or the provider system 280 may also be connected to the local area network or form part of the home network. In this way, device(s) 210 on the home network or local area network may have their security and/or functionality controlled (or maintained or monitored) via the control system 230 on that same network, without having to have a connection to a remote server (i.e. a server outside the home network or not on the local area network). As described above with reference to FIGS. 5a and 5b, there are various ways in which a client device 210 may obtain the web page 214, the webapp 214 or the application 214 (e.g. from the provider system 280 or from the control system 230). In the present embodiments of this example, the source of the web page 214, the webapp 214 or application 214 is preferably also part of the home network or local area network (so that the home or enterprise is self-sustaining).

The same applies analogously in other deployment scenarios. For example, there may be one or more client devices 210 located within, or on, a vehicle (e.g. a car, lorry, motorcycle, train, aeroplane, etc.) which are able to communicate via a local area network established on that vehicle. The vehicle may also comprise the control system 230 which, as set out above, may control (or maintain or monitor) the security and/or functionality of those client device 210. In this way, a secured system may be established within the vehicle without recourse to a remote server. As above, the vehicle may also comprise the provider system 280 and/or the service system 250.

4—System Configuration/Set-up

FIG. 9 is a flowchart illustrating a method 900 for initially configuring or setting-up the system 200 according to some embodiments of the invention.

At a step 902, the underlying functionality for the protected code 216 is specified/decided. This may be carried out, at least in part, by the operator(s) of the provider system 280 and/or the operator(s) of the service system 250. This may involve deciding what kinds of integrity checking, authentication, security checking, configuration checking, etc. is to be carried out and the responses to be implemented based on the outcomes of the integrity checking, authentication, security checking, configuration checking, etc. This may be viewed as establishing a security/configuration policy.

Based on the security/configuration policy, the initial code 222 may be created at a step 904. This may involve implementing one or more modules required in order to enable the webpage 214 to interact with the controller application 232 (as described above with reference to FIG. 3). For the example illustrated in FIGS. 7a and 7b, the security/configuration policy may specify that, if the integrity checking of the webpage 214 fails, then access to content should be denied—in this case, the step 904 may involve deciding that the initial code 222 should include one or more of the modification module 750, the inverse-modification module 752, the decryption module 754 and the other module(s) 770 (as required to interact with the controller application 232 to achieve the integrity checking specified in the policy). Additionally or alternatively, this may involve specifying one or more items of secret data (e.g. cryptographic keys) that need to be stored as part of the protected code 227. Essentially, the step 904 may involve deciding what functionality (modules/code) and/or data need to be included in the initial code 222 to (a) be able to interact with the controller application 232 so as to enable the controller application 232 to carry out any of its integrity checking, authentication, security checking, configuration checking, etc. and (b) be able to enforce or implement the decisions made by the controller application 232 as a result of the integrity checking, authentication, security checking, configuration checking, etc.

At a step 906, the protection system may generate protected code 227, as described above with reference to FIG. 4.

At a step 908, the controller application 232 of the control system 230 is configured to implement the security/configuration policy. As mentioned above, the policy specifies the desired reaction/processing in response to the various possible outcomes of the integrity checking, authentication, security checking, configuration checking, etc. Thus, the control system 230 is configured/programmed to implement these desired reactions—e.g. by configuring logic of the controller application 232 to generate the appropriate responses at the step 308 and interact appropriately with the service system 250 as necessary.

It will be appreciated that the security/configuration policy may specify different response strategies for different users of the client system 210 (e.g. some users may be trusted/premium users and may have a corresponding response strategy, whereas other users may be less trusted and may, therefore, have a different corresponding response strategy). Hence, the security/configuration policy may specify that the controller application 232 should be configured to identify and use a particular response strategy based, for example, on the identifier obtained at the step 652 of FIG. 6b.

5—Example Techniques

Described below as some example techniques by which the protected code 216 and the controller application 232 may, together, implement the above-mentioned integrity verification, authentication/identity checking and other tests/checks.

5.1—Integrity Verification

For (an instance of) protected code 227 generated by the protection application 223, the metadata generator 226 may be arranged to generate one or more sets $S_i$ of code portions identifiers (i=1, . . . , N for some integer N). Each set $S_i$ specifies or comprises a corresponding number $D_i$ (where $D_i$ is a positive integer) of code portion identifiers $P_{i,j}$ (i=1, . . . , N; j=1, . . . , $D_i$). Each code portion identifier $P_{i,j}$ (i=1, . . . , N; j=1, . . . , D) identifies, or specifies, a corresponding portion $A_{i,j}$ (or amount) of code and/or data within the protected code 227 (which may or may not be contiguous within the protected code 227). For example, each portion identifier $P_{i,j}$ (i=1, ..., N; j=1, ..., $D_i$) may be specified by (or may comprise or be defined as) a start location or address of the corresponding portion $A_{i,j}$ within the protected code 227 (e.g. an offset from a beginning of the protected code 227 or from some other point within the protected code 227) and a length of the corresponding portion $A_{i,j}$. The portions $A_{i,j}$ and/or their identifiers $P_{i,j}$ (e.g. the start locations and the lengths) may be randomly selected by the metadata generator 226 (e.g. random start locations and random lengths, although a minimum length may be imposed on the selection of the length). Additionally, or alternatively, the metadata generator 226 may receive input from the protector module(s) 224 to help generate or identify at least some of the identifiers $P_{i,j}$ (i=1, ..., N; j=1, ..., $D_i$), such as to ensure that at least one of the identifiers $P_{i,j}$ in each set $S_i$ (i=1, ..., N) specifies a portion $A_{i,j}$ that at least overlaps one or more target (e.g. important) parts of the protected code 227 (e.g. parts whose integrity it would normally be good to check since they may contain sensitive information, or they may contain information used to distinguish between different diversified instances of the protected code 227, or they may contain be likely candidate parts for attackers to modify when launching an attack). The code portions $A_{i,j}$ corresponding to each set $S_i$ are preferably different from the code portions $A_{i,j}$ for the other sets $S_i$. The collection of sets of code portion identifiers $S_i$ for each instance of protected code 277 is preferably different from the collection of sets of code portion identifiers $S_i$ for other instances of that protected code 227.

The value of N may be predetermined. The value of N may vary from one (instance of) protected code 227 to another (instance of) protected code 227. Preferably, the value of N is large enough (i.e. sufficient sets $S_i$ (i=1, ... N) are generated) so that integrity verification can continue to be performed for as long as the protected code 227 is being used (or is expected to be used) at the client system 210. For i=1, ..., N, the value of $D_i$ may be predetermined; alternatively, the value of $D_i$ may change between sets $S_i$ (for example, $D_i$ may be randomly generated, although a predetermined minimum value for $D_i$ may be imposed).

The metadata generator 226 may comprise a check-value generator module or function. The check-value generator module or function may be arranged to receive a set $S_i$ of code portion identifiers and generate a check-value based on the portions $A_{i,j}$ within the protected code 227 identified by the identifiers $P_{i,j}$ (j=1, ..., $D_i$) of that set $S_i$. This may involve, for example, creating a check-value that is a hash of, or based on, the portions $A_{i,j}$ (j=1, ..., $D_i$), for example a hash or a cryptographic hash of a concatenation (or some other combination) of the portions $A_{i,j}$ (j=1, ..., $D_i$)—(cryptographic) hashing algorithms are well-known and shall, therefore, not be described in detail herein. Alternatively, this may involve creating some check-value, such as a checksum of, or based on, the portions $A_{i,j}$ (j=1, ..., $D_i$), for example a checksum of a concatenation (or some other combination) of the portions $A_{i,j}$ (j=1, ..., $D_i$). The check-value generator module or function may make use of secret information (such as a cryptographic key)—this secret information may be specific to the particular (instance of) protected code 227. For example, if a hashing algorithm is used, then the hashing algorithm may make use of a cryptographic key to seed or configure the hashing performed. The metadata generator 226 may, therefore, be arranged to use the check-value generator module or function to generate a check-value $V_i$ for each of the sets $S_i$ (i=1, ..., N) based on, or for, the particular (instance of) protected code 227. The metadata generator 226 may store the sets $S_i$ (i=1, ..., N) and their respective check-value $V_i$ as part of the metadata 228 associated with the (instance of) protected code 227.

The protector module(s) 224 may then be configured to include (in a secured manner) the check-value generator module or function as part of the protected code 227—this may, for example, be implemented as one of the modules 770 shown in FIG. 7b. The check-value generator module or function is configured to use the above-mentioned secret information (if any) specific to the particular (instance of) protected code 227. Thus, the protected code 227 has the functionality to receive a set $S_i$ of code portion identifiers and generate a check-value based on portions $A_{i,j}$ specified by the set $S_i$ within that protected code 227 (i.e. within itself).

Figure 10A:
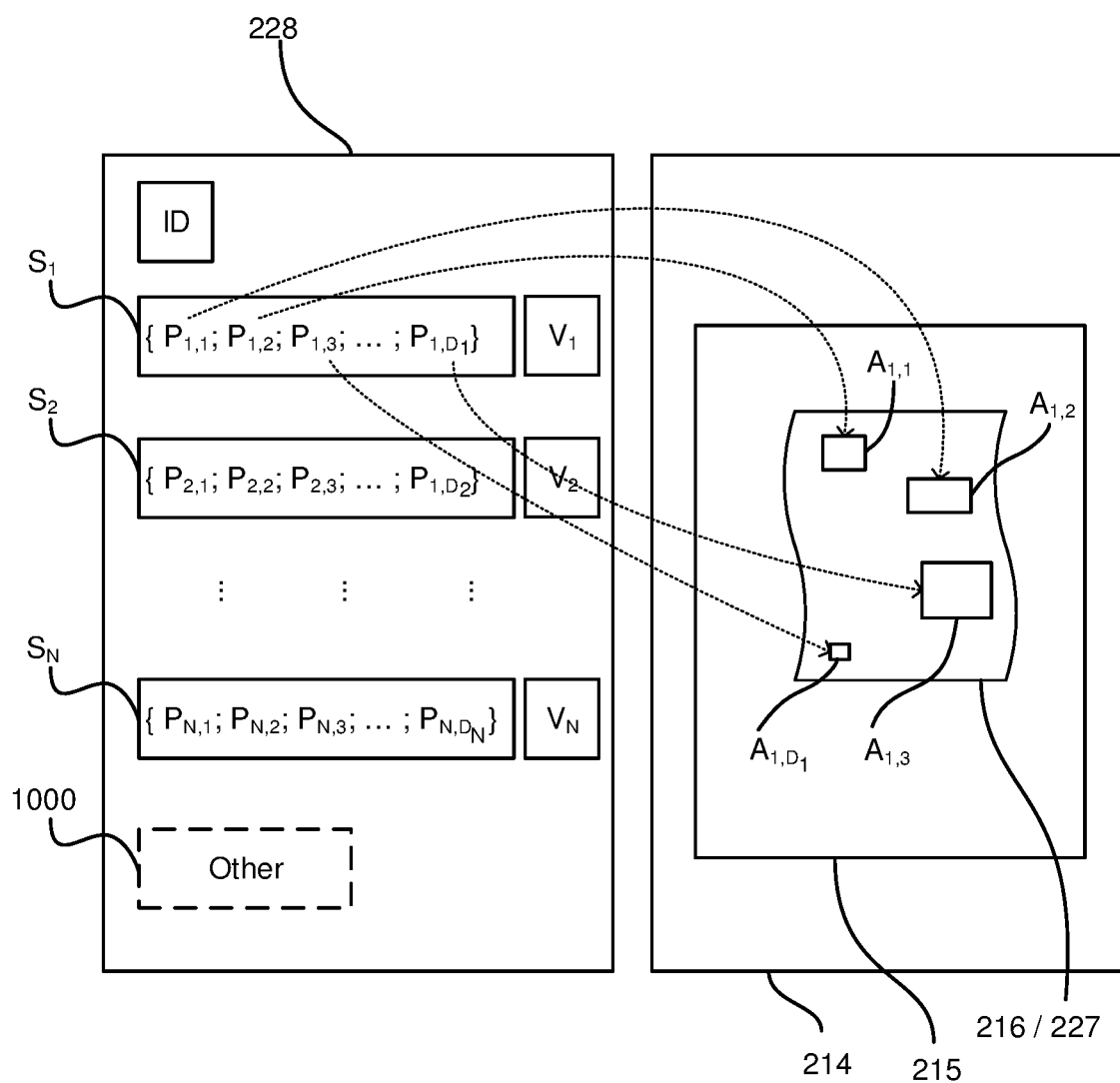
FIGS. 10a and 10b schematically illustrate examples of the metadata generated for protected code according to some embodiments of the invention.

FIG. 10a schematically illustrates an example, according to some embodiments of the invention, of the above-mentioned metadata 228 generated for protected code 227. As shown, the metadata 228 may comprise an identifier (ID) for the particular instance of the protected code 227. The metadata 228 comprises the sets $S_i$ of code portions identifiers and the corresponding check-values $V_i$. The metadata 228 may, of course, comprise other data 1000 too. Although FIG. 10a only illustrates the code portions $A_{1,j}$ (j=1, ..., $D_1$), and not the other code portions $A_{i,j}$ (i=2, ..., N; j=1, ..., $D_i$), this is merely for ease of illustration.

Figure 10B:
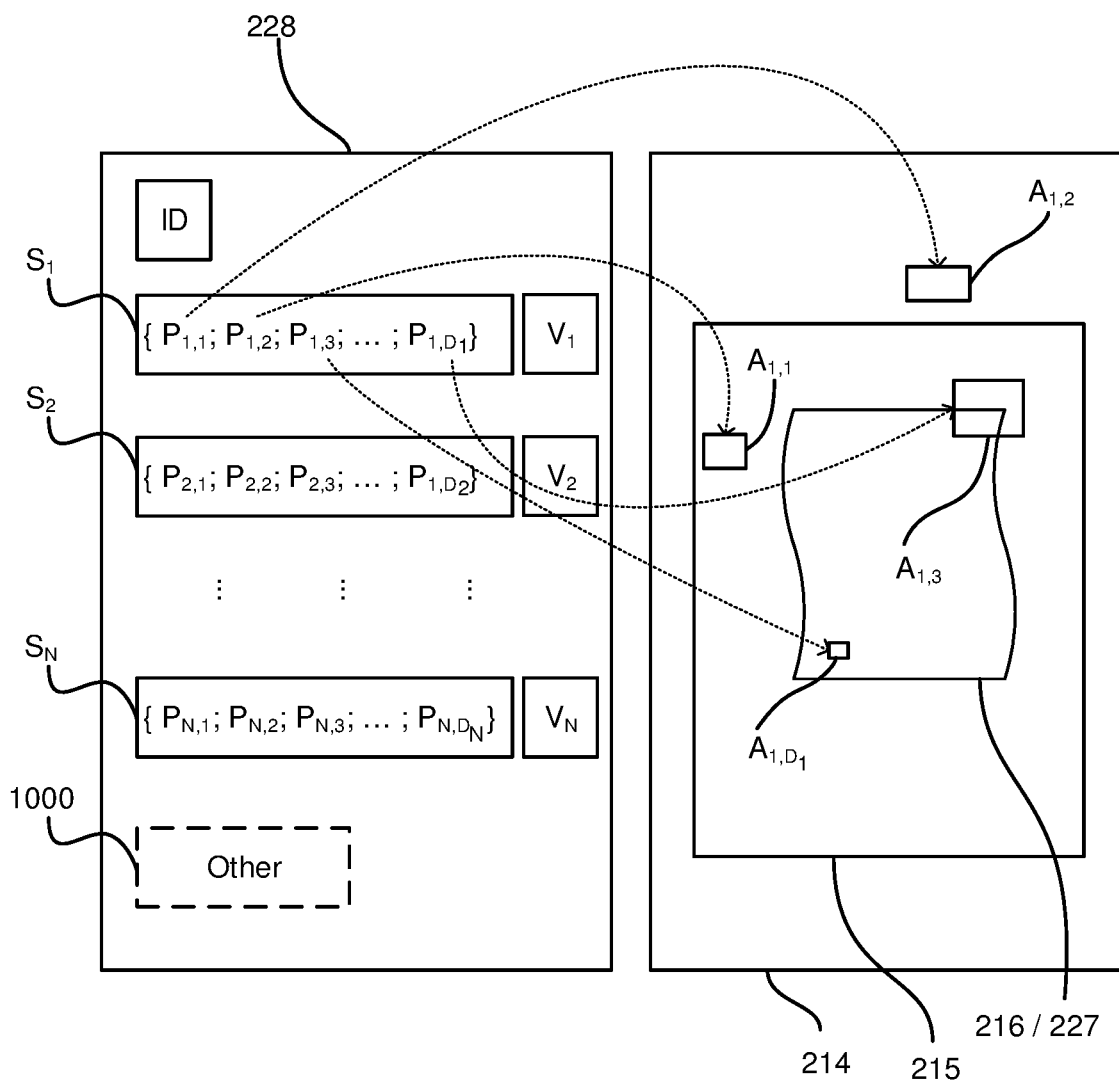

In some embodiments, some or all of the code portions comprise code and/or data of (a) the webpage 214 (e.g. the DOM of the webpage 214, such as nodes and/or properties of the DOM) and/or (b) the code 215 (other than the protected code 216/227) instead of, or in addition to, code and/or data of the protected code 216/227. This is illustrated schematically in FIG. 10b, in which (i) the code portion $A_{1,2}$ comprises code/data from the webpage 214 (other than from the code 215); (ii) the code portion $A_{1,1}$ comprises code/data from the code 215 (other than from the protected code 216/227); and (iii) the code portion $A_{1,3}$ comprises code/data from both the code 215 (other than the protected code 216/227) as well as code/data from the protected code 216/227.

Therefore, in some embodiments of the invention, the integrity verification may be performed as follows:

The protected code 216 may use its check-value generator module or function to generate a check value $V_i^*$ (or the above so-called modification data) based on code portions $A_{i,j}$ specified by a particular set $S_i$ of code portion identifiers. The request sent by the protected code 216 at the step 304 may, therefore, comprise the check value $V_i^*$.

At the step 656 of FIG. 6b, the controller application 232 may obtain, from the metadata 228 corresponding to the protected code 216 (e.g. as identified at the steps 652 and 654) the correct/expected check value $V_i$ that corresponds to this particular set $S_i$ of code portion identifiers $S_i$. If the received check value $V_i^*$ matches the correct/expected check value $V_i$, then the protected code 216 passes the integrity verification check; if the received check value $V_i^*$ does not match the correct/expected check value $V_i$, then the protected code 216 fails the integrity verification check.

The protected code 216 may be initially configured to use a particular set of code portion identifiers, such as the set $S_i$. Thus, the first time that the protected code 216 sends a request to the controller application 232, the controller application 232 knows which set of code portion identifiers should have been used (e.g. the first one specified/listed in the metadata 228 for this particular instance of the protected code 216). When the controller application 232 generates a response to be sent back to the protected code 216, the controller application 232 may identify a next set of code portion identifiers to be used and may include this set of code portion identifiers in the response—in this way, the protected code 216 can be dynamically informed of which code portion identifiers it needs to use for the ongoing integrity verification. The controller application 232 may store, as part of the metadata 216, an index/identifier of the next set of code portion identifiers that it expects the protected code 216 to use. Alternatively, instead of having to store such "state" information in the metadata 228, the controller application 232 could, after using a set of code portion identifiers $S_i$ for the integrity verification, delete that set of code portion identifiers $S_i$ (and the corresponding check value $V_i$) from the metadata 227—the controller application 232 may, therefore, be arranged to simply use the first set of code portion identifiers $S_i$ in the current list of code portion identifiers in the metadata 228.

During a user session, there may be many integrity verification interactions between protected code 216 at the client system 210 and the controller application 232 at the control system 230. Each time such an interaction, the controller application 232 may coordinate and manage the dynamic nature, randomness and uniqueness of the check value with protected code 216 by using metadata 228 in order to maintain the integrity of webpage 214 (or the code 215 and/or protected code 216). Such control by the controller application 232 in this way makes it significantly more challenging for an attacker to successfully launch an attack against/using the webpage 214 and/or the protected code 216.

It will be appreciated that other methods for performing integrity verification could be used.

Having the integrity verification based on code and/or data taken not just from the protected code 216 but, potentially, taken from the other code 215 and/or the webpage 214 means that the scope of the integrity verification expands to include checking that the protected code 216 is being used as part of an expected amount of code 215 and/or within the expected webpage 214. For example, with the content player example in section 3.3 above, if the integrity verification is based on code and/or data of the webpage 214 itself (i.e. not just based the code 215), then it is possible to identify if the protected code 216 (or the content player) has been transferred/copied to another (unauthorised) webpage 214—if this is detected by the controller application 232, then the controller application 232 would be able to stop the content player from playing content (as discussed above).

5.2—Identification

As mentioned above, the protection application 232 may be arranged to generate multiple different protected instances 227 based on the same initial code 222. This may involve positively embedding an identifier that is unique to a specific instance 227 within that instance (using any of the above-mentioned methods for securely storing/using data within protected code). Additionally or alternatively, this may involve applying the software protection techniques to the initial code 222, but based on different seeds or cryptographic keys, so as to yield different differently protected instances—in this case, an instance of the protected code 227 may be configured to derive a value unique to that instance from the particular code/data generated for that instance.

When an instance of protected code 227 is provided to the client system 210 (to be used as protected code 216 as part of the webpage 214), details related to the provision of that instance of protected code 227 may be stored as part of the metadata 228 associated with that instance, such as one or more of: date and/or time of provision of the protected code 227; details (such as name, IP address, etc.) of the provider system 280 which requested the instance of protected code 227; details (such as name or other identifier, IP address, identity of a user, etc.) of the client system 210 to which the instance of protected code 227 is to be provided; etc. In some embodiments, the control system 230 and the client system 210 may use a session cookie so that the control system 230 can identify which particular instance of protected code 227 the client system 210 is currently executing.

The request generated by the protected code 216 at the step 302 may comprise the identifier of the particular instance (or data from which the controller application 232 can derive the identifier of the particular instance). The request may also comprise other details about the client system 210, such as one or more of: name, IP address, identity of a user, etc. of the client system 210. The controller application 232 may, therefore, perform the following at the step 308:

Obtain (or derive) the identifier from the received request (the step 652 of FIG. 6b).

Access or obtain the metadata 228 corresponding to the instance of protected code 216 identified by this identifier (the step 654 of FIG. 6b).

One of the tests/checks performed at the step 658 of FIG. 6b may be an identity check to determine whether the details about the client system 210 as received in the request match the details about the client system 210 stored in the metadata 228 for the instance of protected code 216. For example, the controller application 232 may check whether one or more of the name, IP address, user name, etc. provided in the request differ from the expected name, IP address, user name stored in the metadata 228. If there is a difference, then this identity check may fail and the controller application 232 may take appropriate measures; if there is not a difference (or not a significant difference), then this identity check may pass. Control enforced by the controller application 232 in this way helps prevent unauthorised distribution of code 215 and/or webpages 214.

It will be appreciated that other methods for obtaining, and performing tests/check based on, the identity of the protected code 216 running at the client system 210 could be used, such as using single sign-on protocols (see, for example, https://en.wikipedia.org/wiki/Single_sign-on, the entire disclosure of which is incorporated herein by reference) and/or using SSL certificates.

5.3—Debugger Detection

The code 215 and/or the protected code 216 will inherently have one or more sequences of function/procedure calls that would be expected to be performed (assuming that the code 215 and/or protected code 216 has not been modified) and/or an expected timing of calling or performance of functions/procedures or sequences of functions/procedures (assuming that the code 215 and/or protected code 216 has not been modified). Such sequences and/or timings may occur at one or more expected stages when the protected code 216 is to generate and send a request to the controller application 232 at the step 302. For example, if the protected code 216 is to generate and send a request to the controller application 232 due to the user of the client system 210 having interacted with the webpage 214 in a particular manner (e.g. having clicked a button or other control on the displayed webpage 214), then there may be sequences and/or timings as mentioned above that would be expected if the user had interacted with the webpage 214 in a legitimate expected manner, as opposed to reaching that stage or performing that interaction with, say, a debugger.

Consequently, the metadata generator 226 may be arranged to ascertain data regarding one or more sequences of function/procedure calls that would be expected to be performed—for example, what the call stack would be expected to look like if that sequence of functions/procedures were called in the expected way to reach a particular stage of functionality. Additionally, or alternatively, the metadata generator 226 may be arranged to ascertain data regarding timing of performance of functions/procedures or sequences of functions/procedures, such as how long after a first function has been called would it be expected for a second function to be called. The metadata generator 226 may store such ascertained data as part of the metadata 228 associated with the (instance of) protected code 227.

The protected code 227 may, therefore, be arranged to generate a request (at the step 302) that comprises data relating to a sequence of function/procedure calls (e.g. data about a current call stack at the client system 210) and/or data relating to current timing of calling or performance of certain functions/procedures or certain sequences of functions/procedures by client system 210. One of the tests/checks performed at the step 658 of FIG. 6b may be an anti-debug check to determine whether the function call and/or timing data received in the request match the expected function call and/or timing data stored in the metadata 228 for the instance of protected code 216. If there is a difference, then this anti-debug check may fail (because these differences may be indicative of an attacker using a debugger to modify the control flow through the code 215 and/or being slowed down or sped up due to execution of the code 215 using the debugger) and the controller application 232 may take appropriate measures as discussed above; if there is not a difference (or not a significant difference), then this anti-debug check may pass. Control enforced by the controller application 232 in this way helps thwart attacks launched by attackers via a debugger.

It will be appreciated that other methods for obtaining data indicative of use of debuggers, and performing anti-debugger tests based on such data, could be used. For example, a response generated by the controller application 232 at the step 308 may comprise a nonce (or a random value) so that the controller application 232 may share/initialise this secret value with the protected code 216; alternatively, a request generated by the protected code at the step 302 may comprise a nonce (or a random value) so that the protected code 216 may share/initialise this secret value with the controller application 232. The controller application 232 may store this shared value as part of the metadata 228 for the particular instance of the protected code 216 at the client system 210. The controller application 232 and the protected code 216 may be arranged to periodically modify/update their own version of this shared value (e.g. increment it by 1 every n seconds for some predetermined value n). A subsequent request generated by the protected code 216 at the step 302 may comprise its version of this updated value, and the controller application 232, at the step 308, may compare the updated value that the controller application 232 has been generating itself (i.e. its own local value) with the updated value received in the request—if they are not equal (or differ by more than a predetermined threshold, so as to cater for communication delays, drift, etc.), then the controller application 232 may conclude that the code 215 and/or the protected code 216 is being executed with a debugger and take appropriate measures as discussed above.

5.4—Watch Identification

As mentioned above, the request generated at the step 302 by the protected code 216 may comprise watch data that indicates that (or whether or not) data of the webpage 214 (e.g. as presented by a visual representation of the webpage 214) is being copied from the visual representation or from within the webpage 214. This can be achieved, for example, by the protected code 216 monitoring the DOM of the webpage 214 for listeners on the content of the webpage 214—"web listeners" are well-known and shall not, therefore, be described in more detail herein. The protected code 216 may be configured with an indication/identity of one or more expected or authorised listeners. If the protected code 216 identifies an unexpected or unauthorised listener, then the protected code 216 may be configured to conclude that such copying is taking place. Additionally or alternatively, the protected code 216 may be configured to check the DOM of the webpage 214 for cloned forms—if the protected code 216 detects a cloned form, then the protected code 216 may be configured to conclude that such copying is taking place.

If the controller application 232 determines, from watch data in a received request, that data of the webpage 214 (e.g. as presented by a visual representation of the webpage 214) is being copied from the visual representation or from within the webpage 214, then the controller application 232 may be configured to generate the response, at the step 308, that includes a corresponding instruction (or flag or indicator or other data). The protected code 216 may, therefore, be arranged to identify, at the step 314, the presence of this instruction in the response received at the step 312 and, in response to detecting such an instruction in the response, perform one or more countermeasures. Such countermeasures could include using, or instigating, one or more security features of the browser 212 to implement security of the browser's user interface, e.g. to lock down form (using, for example, the well-known iframe approach or the W3C ironframe approach). Further detail can be found at, for example, https://dvcs.w3.org/hg/user-interface-safety/raw-file/tip/user-interface-safety.html, the entire disclosure of which is incorporated herein by reference.

5.5—Validation Enforcement

As mentioned above, the request generated at the step 302 by the protected code 216 may comprise validation-checking data that indicates that (or whether or not) validation of data fields of the displayed webpage 214 is turned off, or somehow disabled, within the browser 212 or the webpage 214. This can be achieved, for example, by using integrity verification as set out in section 5.1 above—in particular, in a set $S_i$ (i=1, . . . , N) of code portion identifiers, one or more of these code portions identifiers $P_{i,j}$ (i=1, . . . , N; j=1, . . . , $D_i$) may identify a corresponding portion $A_{i,j}$ (or amount) of code and/or data within the protected code 216, where that portion $A_{i,j}$ of code provides some or all of the functionality for data field validation.

If the controller application 232 determines, from validation-checking data in a received request, that validation of data fields of the displayed webpage 214 is turned off, or somehow disabled, within the browser 212 or the webpage 214, then the controller application 232 may be configured to generate the response, at the step 308, that includes a corresponding instruction (or flag or indicator or other data). The protected code 216 may, therefore, be arranged to identify, at the step 314, the presence of this instruction in the response received at the step 312 and, in response to detecting such an instruction in the response, perform one or more countermeasures. Such countermeasures could include (a) stopping (or preventing completion of) a transaction or other procedure currently being conducted or requested via the webpage 214 (so that such a transaction/procedure cannot take place based on non-validated data) and/or (b) causing the webpage 214 to continue with the transaction/procedure but in a manner that alerts the service system 250 or the provider system 280 that the transaction/procedure is being requested/performed based on non-validated data (e.g. by setting a flag in communications from the webpage 214 that are to be sent to the service system 250 or the provider system 280) and/or (c) taking countermeasures as set above in relation to failed integrity verification.

5.6—Advertisement Blocking Checking

As mentioned above, the request generated at the step 302 by the protected code 216 may comprise advertisement-blocking-checking data that indicates that (or whether or not) the blocking of advertisements (e.g. advertisements provided by the webpage 214) is turned on or off within the browser 212. This can be achieved, for example, by using integrity verification as set out in section 5.1 above—in particular, in a set $S_i$ (i=1, ..., N) of code portion identifiers, one or more of these code portions identifiers $P_{i,j}$ (i=1, ..., N; j=1, ..., $D_i$) may identify a corresponding portion $A_{i,j}$ (or amount) of code and/or data within the protected code 216, where that portion $A_{i,j}$ of code provides some or all of the functionality related to the provision of advertisements. Additionally, or alternatively, this may be achieved by inspecting the DOM of the webpage 214—for example: (a) as mentioned above, some or all of the code portions $A_{i,j}$ may comprise parts of the DOM, in which case, a code portion $A_{i,j}$ may comprise data (e.g. images, videos) of the DOM that relate to advertisements or other content to ensure that that data has not been corrupted/modified/deleted/etc.; (b) the protected code 216 may inspect the DOM to see if anything is being displayed/rendered on top of an advertisement (thereby effectively "blocking" the advertisement); (c) the protected code 216 may check to see whether there is expected heartbeat data related, for example, to the display of video data—the absence of such heartbeat data may be taken as an indication that display of a video advertisement is being blocked; (d) etc. Such checking may be based on metadata 228 (e.g. to specify which code portions $A_{i,j}$ to use; to specify expected heartbeat data; etc.).

If the controller application 232 determines, from advertisement-blocking-checking data in a received request, that blocking of advertisements is turned off, or somehow disabled, within the browser 212 or the webpage 214, then the controller application 232 may be configured to generate the response, at the step 308, that includes a corresponding instruction (or flag or indicator or other data). The protected code 216 may, therefore, be arranged to identify, at the step 314, the presence of this instruction in the response received at the step 312 and, in response to detecting such an instruction in the response, perform one or more countermeasures. Such countermeasures could include (a) manipulation of the DOM of the webpage 214 to cease display of content and/or inform the user of the browser 212 that continued use of the webpage 214 requires them to view advertisements and/or (b) taking countermeasures as set out above in relation to failed integrity verification.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for securing a webpage or a webapp processed by a browser executing on a client system, the method comprising the browser executing an instance of white-box protected code, wherein execution of the instance of white-box protected code causes the client system to:
generate a message comprising message data for use by a
control system to perform one or more security tests, the control system communicably connected to the client system via a network;

send the message to the control system to enable the control system to perform the one or more security tests using the message data;

receive a response from the control system based, at least in part, on the message; and process the response;

wherein the response comprises response data and wherein the instance of white-box protected code is arranged to generate, based on the response data, message data of a subsequent message for use by the control system to perform the one or more security tests.

2. The method of claim 1, wherein the instance of white-box protected code is part of the webpage or webapp.

3. The method of claim 1, wherein the one or more security tests comprises one or more of:
   (a) a test to verify integrity of some or all of the instance of white-box protected code;
   (b) a test to verify integrity of some or all of the webpage or webapp;
   (c) a test to identify whether the instance of white-box protected code is being executed using a debugger;
   (d) a test to identify whether data relating to, or provided by, the webpage or webapp is being, or has been, copied;
   (e) a test to identify whether validation of data fields of the webpage or webapp is turned on or off;
   (f) a test to identify whether blocking of advertisements is turned on or off.

4. The method of claim 3, wherein the test to verify integrity of some or all of the webpage or webapp comprises verifying integrity of some or all of the DOM of the webpage or webapp.

5. The method of claim 1, wherein one or both of the following apply:
   (i) the response is generated, at least in part, based on an outcome of the one or more security tests; and
   (ii) the response, when processed by the client system, causes the client system to perform one or more of:
      (a) provide, or continue to provide, functionality of the webpage or webapp;
      (b) prevent provision of, or cease provision of, functionality of the webpage or webapp;
      (c) provide functionality that is alternative or supplementary to functionality of the webpage or webapp;
      (d) change one or more configuration settings of the client system and/or of the browser.

6. The method of claim 5, wherein the response data identifies (i) one or more portions of the instance of white-box protected code and/or (ii) one or more portions of the webpage or webapp, wherein an integrity verification test is to be performed by the control system based on said one or more portions.

7. The method of claim 1, wherein the instance of white-box protected code is arranged to generate the message in encrypted form and wherein the control system is arranged to generate the response in encrypted form.

8. The method of claim 1, wherein said webpage or webapp is arranged to interact with a service system communicably connected to the client system via a network, wherein the message comprises a request to be sent to the service system.

9. The method of claim 1, wherein the webpage or webapp provides access to content via a content distribution network.

10. The method of claim 1, wherein at least one of the one or more security tests is based, at least in part, on metadata associated with the instance of white-box protected code, the metadata accessible by the control system.

11. A method for securing a webpage or a webapp processed by a browser executing on a client system, the method comprising, at a control system communicably connected to the client system via a network:

receiving a message from the client system, the message comprising message data for use by the control system to perform one or more security tests, the message generated by an instance of white-box protected code being executed by the browser;

performing the one or more security tests using the message data;

generating a response based, at least in part, on the message; and sending the response to the client system for processing by the client system;

wherein the response comprises response data and wherein the instance of white-box protected code is arranged to generate, based on the response data, message data of a subsequent message for use by the control system to perform the one or more security tests.

12. The method of claim 11, wherein the instance of white-box protected code is part of the webpage or webapp.

13. The method of claim 11, wherein the one or more security tests comprises one or more of:
   (a) a test to verify integrity of some or all of the instance of white-box protected code;
   (b) a test to verify integrity of some or all of the webpage or webapp;
   (c) a test to identify whether the instance of white-box protected code is being executed using a debugger;
   (d) a test to identify whether data relating to, or provided by, the webpage or webapp is being, or has been, copied;
   (e) a test to identify whether validation of data fields of the webpage or webapp is turned on or off;
   (f) a test to identify whether blocking of advertisements is turned on or off.

14. The method of claim 13, wherein the test to verify integrity of some or all of the webpage or webapp comprises verifying integrity of some or all of the DOM of the webpage or webapp.

15. The method of claim 11, wherein one or both of the following apply:
   (i) the response is generated, at least in part, based on an outcome of the one or more security tests; and
   (ii) the response, when processed by the client system, causes the client system to perform one or more of:
      (a) provide, or continue to provide, functionality of the webpage or webapp;
      (b) prevent provision of, or cease provision of, functionality of the webpage or webapp;
      (c) provide functionality that is alternative or supplementary to functionality of the webpage or webapp;
      (d) change one or more configuration settings of the client system and/or of the browser.

16. The method of claim 15, wherein the response data identifies (i) one or more portions of the instance of white-box protected code and/or (ii) one or more portions of the webpage or webapp, wherein an integrity verification test is to be performed by the control system based on said one or more portions.

17. The method of claim 11, wherein the instance of white-box protected code is arranged to generate the message in encrypted form and wherein the control system is arranged to generate the response in encrypted form.

18. The method of claim 11, wherein said webpage or webapp is arranged to interact with a service system communicably connected to the client system via a network, wherein the message comprises a request to be sent to the service system.

19. The method of claim 18, comprising one or more of:
(a) the control system interacting with the service system;
(b) determining, based on an outcome of the one or more security tests, whether the control system should interact with the service system and, if it is determined that the control system should interact with the service system, the control system interacting with the service system;
(c) the control system storing data, based on the message, in a repository for subsequent access by the service system; and
(d) the control system providing the service system an indication of an outcome of the one or more security tests.

20. The method of claim 19, wherein one or both of the following apply:
(a) the response is generated based, at least in part, on the interaction of the control system with the service system; and
(b) the response comprises a reply, from the service system, to the request.

21. The method of claim 11, wherein the webpage or webapp provides access to content via a content distribution network.

22. The method of claim 11, wherein at least one of the one or more security tests is based, at least in part, on metadata associated with the instance of white-box protected code, the metadata accessible by the control system.

23. A method for securing a webpage or a webapp processed by a browser executing on a client system, the method comprising, at a control system communicably connected to the client system via a network:
receiving a message from the client system, the message comprising message data for use by the control system to perform one or more security tests, the message generated by an instance of white-box protected code being executed by the browser;
performing the one or more security tests using the message data;
generating a response based, at least in part, on the message; and
sending the response to the client system for processing by the client system;
wherein at least part of the message data is indicative of an identity of the instance of white-box protected code.

24. A method for securing a webpage or a webapp processed by a browser executing on a client system, the method comprising, at a control system communicably connected to the client system via a network:
receiving a message from the client system, the message comprising message data for use by the control system to perform one or more security tests, the message generated by an instance of white-box protected code being executed by the browser;
performing the one or more security tests using the message data;
generating a response based, at least in part, on the message; and
sending the response to the client system for processing by the client system;
wherein said webpage or webapp is arranged to interact with a service system communicably connected to the client system via a network, wherein the message comprises a request to be sent to the service system, wherein the service system provides financial services and the webpage or webapp provides access to the financial services, wherein the financial services comprise one or more of:
accessing a financial account; and/or
financially interacting with a merchant.

25. A method for securing a webpage or a webapp processed by a browser executing on a client system, the method comprising, at a control system communicably connected to the client system via a network:
receiving a message from the client system, the message comprising message data for use by the control system to perform one or more security tests, the message generated by an instance of white-box protected code being executed by the browser;
performing the one or more security tests using the message data;
generating a response based, at least in part, on the message; and
sending the response to the client system for processing by the client system;
wherein the webpage or webapp provides access to content via a content distribution network; and
wherein:
the instance of white-box protected code is arranged to obtain a modified version of encrypted content, the modified version of encrypted content comprising the encrypted content with a first modification applied thereto;
the response comprises data indicative of a second modification to apply to the modified version of encrypted content;
processing the response comprises the instance of white-box protected code applying the second modification to the modified version of encrypted content to form processed modified encrypted content; and
the webpage or webapp is arranged to output content based on the processed modified encrypted content.

26. The method of claim 25, wherein the second modification is arranged so that the processed modified encrypted content equals the encrypted content only if an outcome of the one or more tests indicates that the client system is authorized to access the content.

27. The method of claim 25, wherein:
the instance of white-box protected code is arranged to receive the encrypted content and apply the first modification to the received encrypted content to thereby obtain the modified version of encrypted content; or
the instance of white-box protected code is arranged to receive the modified version of encrypted content via the network.

28. A non-transitory computer-readable medium storing a computer program which, when executed by a processor of a control system communicably connected to a client system via a network, causes the processor to carry out a method for securing a webpage or a webapp processed by a browser executing on the client system, the method comprising:
receiving a message from the client system, the message comprising message data for use by the control system to perform one or more security tests, the message generated by an instance of white-box protected code being executed by the browser;

performing the one or more security tests using the message data;

generating a response based, at least in part, on the message; and sending the response to the client system for processing by the client system;

wherein the response comprises response data and wherein the instance of white-box protected code is arranged to generate, based on the response data, message data of a subsequent message for use by the control system to perform the one or more security tests.

29. A system arranged to secure a webpage or a webapp processed by a browser executing on a client system, the system comprising a control system communicably connected to the client system via a network, wherein the control system is arranged to:

receive a message from the client system, the message comprising message data for use by the control system to perform one or more security tests, the message generated by an instance of white-box protected code being executed by the browser;

perform the one or more security tests using the message data;

generate a response based, at least in part, on the message; and send the response to the client system for processing by the client system;

wherein the response comprises response data and wherein the instance of white-box protected code is arranged to generate, based on the response data, message data of a subsequent message for use by the control system to perform the one or more security tests.

30. A method of providing a webpage or a webapp to a client system, the method comprising providing a webpage or webapp that comprises an instance of white-box protected code or an address from which the instance of white-box protected code is obtainable, wherein execution of the instance of white-box protected code by a browser of the client system secures the webpage or webapp by causing the client system to:

generate a message comprising message data for use by a control system to perform one or more security tests, the control system communicably connected to the client system via a network;

send the message to the control system to enable the control system to perform the one or more security tests using the message data;

receive a response from the control system based, at least in part, on the message; and process the response;

wherein the response comprises response data and wherein the instance of white-box protected code is arranged to generate, based on the response data, message data of a subsequent message for use by the control system to perform the one or more security tests.

31. The method of claim 30, comprising determining the particular instance, from a plurality of instances of white-box protected code, to include as part of the webpage or webapp to provide to the client system or in response to a request from the client system via the address.

32. A method comprising:

generating a plurality of instances of white-box protected code, wherein execution of each instance of white-box protected code by a browser of a client system secures the webpage or webapp by causing the client system to:

generate a message comprising message data for use by a control system to perform one or more security tests, the control system communicably connected to the client system via a network;

send the message to the control system to enable the control system to perform the one or more security tests using the message data;

receive a response from the control system based, at least in part, on the message; and process the response; and storing the plurality of instances of white-box protected code in a database accessible by the control system, wherein the control system is arranged to:

receive a message from the client system, the message comprising message data for use by the control system to perform one or more security tests, the message generated by an instance of white-box protected code being executed by the browser;

perform the one or more security tests using the message data;

generate a response based, at least in part, on the message; and send the response to the client system for processing by the client system;

wherein the response comprises response data and wherein the instances of white-box protected code are arranged to generate, based on the response data, message data of a subsequent message for use by the control system to perform the one or more security tests.

33. The method of claim 32, comprising generating, and storing in the database, respective metadata associated with each of the plurality of instances of white-box protected code, the metadata for use by the system to perform said one or more security tests, the metadata accessible by the system.

34. A method for securing a webpage or a webapp processed by a browser executing on a client system, the method comprising the browser executing an instance of white-box protected code, wherein execution of the instance of white-box protected code causes the client system to:

generate a message comprising message data for use by a control system to perform one or more security tests, the control system communicably connected to the client system via a network;

send the message to the control system to enable the control system to perform the one or more security tests using the message data;

receive a response from the control system based, at least in part, on the message; and process the response, wherein at least part of the message data is indicative of an identity of the instance of white-box protected code.

35. A method for securing a webpage or a webapp processed by a browser executing on a client system, the method comprising the browser executing an instance of white-box protected code, wherein execution of the instance of white-box protected code causes the client system to:

generate a message comprising message data for use by a control system to perform one or more security tests, the control system communicably connected to the client system via a network;

send the message to the control system to enable the control system to perform the one or more security tests using the message data;

receive a response from the control system based, at least in part, on the message; and process the response;

wherein said webpage or webapp is arranged to interact with a service system communicably connected to the client system via a network, wherein the message comprises a request to be sent to the service system; and wherein the service system provides financial services and the webpage or webapp provides access to the financial services, wherein the financial services comprise one or more of:

accessing a financial account; and/or financially interacting with a merchant.

36. A method for securing a webpage or a webapp processed by a browser executing on a client system, the method comprising the browser executing an instance of white-box protected code, wherein execution of the instance of white-box protected code causes the client system to:

generate a message comprising message data for use by a control system to perform one or more security tests, the control system communicably connected to the client system via a network;

send the message to the control system to enable the control system to perform the one or more security tests using the message data;

receive a response from the control system based, at least in part, on the message; and process the response;

wherein the webpage or webapp provides access to content via a content distribution network; and wherein:

the instance of white-box protected code is arranged to obtain a modified version of encrypted content, the modified version of encrypted content comprising the encrypted content with a first modification applied thereto;

the response comprises data indicative of a second modification to apply to the modified version of encrypted content;

processing the response comprises the instance of white-box protected code applying the second modification to the modified version of encrypted content to form processed modified encrypted content; and the webpage or webapp is arranged to output content based on the processed modified encrypted content.

37. The method of claim 36, wherein the second modification is arranged so that the processed modified encrypted content equals the encrypted content only if an outcome of the one or more tests indicates that the client system is authorized to access the content.

38. The method of claim 36, wherein:

the instance of white-box protected code is arranged to receive the encrypted content and apply the first modification to the received encrypted content to thereby obtain the modified version of encrypted content; or the instance of white-box protected code is arranged to receive the modified version of encrypted content via the network.

* * * * *